United States Patent
Carbone et al.

(10) Patent No.: US 11,048,228 B2
(45) Date of Patent: Jun. 29, 2021

(54) SYSTEM AND METHOD TO PROTECT ITEMS ASSOCIATED WITH ADDITIVE MANUFACTURING

(71) Applicant: General Electric Company, Schenectady, NY (US)

(72) Inventors: John William Carbone, Ballston Spa, NY (US); Benjamin Edward Beckmann, Niskayuna, NY (US); Michael Solomon Idelchik, Niskayuna, NY (US)

(73) Assignee: General Electric Company, Schenectady, NY (US)

(*) Notice: Subject to any disclaimer, the term of this patent is extended or adjusted under 35 U.S.C. 154(b) by 78 days.

(21) Appl. No.: 15/923,268

(22) Filed: Mar. 16, 2018

(65) Prior Publication Data
US 2019/0286102 A1    Sep. 19, 2019

(51) Int. Cl.
*G05B 19/4099*    (2006.01)
*B33Y 30/00*    (2015.01)
(Continued)

(52) U.S. Cl.
CPC .......... *G05B 19/4099* (2013.01); *B33Y 30/00* (2014.12); *B33Y 50/02* (2014.12);
(Continued)

(58) Field of Classification Search
CPC ...... G05B 19/4099; G05B 2219/49007; G05B 2219/35134; B33Y 30/00; B33Y 50/02
See application file for complete search history.

(56) References Cited

U.S. PATENT DOCUMENTS 6,885,748 B1    4/2005 Wang
9,098,721 B2    8/2015 Peterson
(Continued)

FOREIGN PATENT DOCUMENTS

WO    WO2018/026727 A1    2/2018

OTHER PUBLICATIONS

Ma, Liang et al., "Temperature and stress analysis and simulation in fractal scanning-based laser sintering", The International Journal of Advanced Manufacturing Technology, vol. 34, Issue: 9, Oct. 2007, DOI: 10.1007/s00170-006-0665-5, (pp. 898-903, 2 total pages).
Thijs, Lore et al., "A study of the microstructural evolution during selective laser melting of Ti—6Al—4V", Acta Materialia, vol. 58, Issue: 9, May 2010, DOI: 10.1016/j.actamat.2010.02.004, (pp. 3303-3312, 10 total pages).
(Continued)

*Primary Examiner* — Christopher E. Everett
(74) *Attorney, Agent, or Firm* — Dority & Manning, P.A.

(57) ABSTRACT

According to some embodiments, a lossless protection procedure may be applied to control distribution of a print geometry of an industrial asset item. For example, an item definition data store may contain electronic records defining a geometry of the industrial asset item. A signature identifier encoder platform may determine a unique signature identifier associated with the industrial asset item and modify the geometry of the industrial asset item to encode therein information about the unique signature identifier. In some cases, for example, this may be done by adjusting a scanning pattern of a fill region (e.g., stripe, checkerboard, etc.) or a support structure of the industrial asset item. An authentication platform may then receive, from a sensor (e.g., an X-ray), a measured characteristic parameter of an item to be authenticated and determine a signature identifier of the item (which can be used to authenticate the item).

14 Claims, 22 Drawing Sheets

(51) Int. Cl.
*B33Y 50/02* (2015.01)
*H04L 9/32* (2006.01)

(52) U.S. Cl.
CPC .. *H04L 9/3226* (2013.01); *G05B 2219/35134* (2013.01); *G05B 2219/49007* (2013.01); *H04L 2209/38* (2013.01)

(56) References Cited

U.S. PATENT DOCUMENTS

| | | | |
|---|---|---|---|
| 9,419,951 B1 | 8/2016 | Felsher et al. | |
| 9,602,477 B1 | 3/2017 | Grzybowski et al. | |
| 9,623,609 B2 | 4/2017 | Williams | |
| 9,674,156 B2 | 6/2017 | Stiglic et al. | |
| 9,722,790 B2 | 8/2017 | Ebrahimi | |
| 2006/0102725 A1* | 5/2006 | Culp | G06K 7/10 235/462.01 |
| 2012/0051584 A1* | 3/2012 | Bonner | G06F 17/50 382/100 |
| 2013/0022238 A1* | 1/2013 | Wood | G07D 7/2033 382/103 |
| 2014/0263674 A1* | 9/2014 | Cerveny | G06K 19/06028 235/494 |
| 2014/0301179 A1* | 10/2014 | Rich | G06T 9/00 369/275.4 |
| 2015/0096266 A1* | 4/2015 | Divine | B29C 64/386 53/452 |
| 2015/0269469 A1 | 9/2015 | Sharma et al. | |
| 2015/0287247 A1* | 10/2015 | Willis | G06T 19/20 345/419 |
| 2016/0067927 A1* | 3/2016 | Voris | B33Y 50/02 700/98 |
| 2016/0098723 A1 | 4/2016 | Feeney | |
| 2016/0260001 A1* | 9/2016 | Flores | G06K 19/06037 |
| 2016/0307083 A1* | 10/2016 | Kumar | G06K 7/1426 |
| 2017/0046548 A1* | 2/2017 | Kamijo | G06K 7/1417 |
| 2017/0072641 A1* | 3/2017 | Grivetti | G05B 19/4099 |
| 2017/0091783 A1* | 3/2017 | Mancevski | G06K 19/06028 |
| 2017/0253354 A1* | 9/2017 | Colson | B65D 75/527 |
| 2017/0279783 A1* | 9/2017 | Milazzo | H04L 63/061 |
| 2018/0012311 A1* | 1/2018 | Small | B33Y 50/02 |
| 2018/0096175 A1* | 4/2018 | Schmeling | B29C 64/10 |
| 2018/0136633 A1* | 5/2018 | Small | G05B 19/4099 |
| 2018/0178451 A1* | 6/2018 | Gosch | G06F 21/608 |
| 2018/0257306 A1* | 9/2018 | Mattingly | H04L 9/3236 |
| 2019/0147174 A1* | 5/2019 | Narasimhan | G06Q 10/0838 |
| 2019/0171849 A1 | 6/2019 | Assenmaher | |

OTHER PUBLICATIONS

Jhabvala, Jamasp et al., "Study and simulation of different scanning strategies in SLM", Oct. 2016, DOI: 10.1201/9780203859476. ch57*Source:OAI, (pp. 1-7, 7 total pages).

Yang, Yongqiang et al., "Accuracy and density optimization in directly fabricating customized orthodontic production by selective laser melting", Rapid Prototyping Journal, vol. 18, Issue: 6, 2012, DOI:10.1108/13552541211272027, (pp. 482-489, 9 total pages).

Su, Xubin et al., "Research on track overlapping during Selective Laser Melting of powders", Journal of Materials Processing Technology, vol. 212, Issue: 10, Oct. 2012, http://dx.doi.org/10.1016/j.jmatprotec.2012.05.012, (pp. 2074-2079, 6 total pages).

Manfredi, Diego et al., "From Powders to Dense Metal Parts: Characterization of a Commercial AlSiMg Alloy Processed through Direct Metal Laser Sintering", Materials, vol. 6, Issue: 3, 2013, DOI: 10.3390/ma6030856, (pp. 856-869, 14 total pages).

Jamaludin, Siti Nur Sakinah et al., "A review on the fabrication techniques of functionally graded ceramic-metallic materials in advanced composites", Scientific Research and Essays, vol. 8, Issue: 21, Jun. 2013, DOI: 10.5897/SRE2012.0743, ISSN: 1992-2248, (pp. 828-840, 13 total pages).

Fadhel, Nawfal F. et al., "Approaches to Maintaining Provenance throughout the Additive Manufacturing Process", World Congress on Internet Security (WorldCIS—2013), London, Dec. 9-12, 2013, (pp. 82-87, 6 total pages).

Wang, X.J. et al., "The effect of atmosphere on the structure and properties of a selective laser melted Al—12Si alloy", Materials Science and Engineering: A, vol. 597, Mar. 12, 2014, DOI: 10.1016/j.msea.2014.01.012, (ppes: 370-375, 6 total pages).

Calignano, F. "Design optimization of supports for overhanging structures in aluminum and titanium alloys by selective laser melting", Materials & Design, vol. 64, Dec. 2014, DOI: 10.1016/j.matdes.2014.07.043, (pp. 203-213, 11 total pages).

Sun, Guifang et al., "Evaluation of defect density, microstructure, residual stress, elastic modulus, hardness and strength of laser-deposited AISI 4340 steel", Acta Materialia, vol. 84, Feb. 1, 2015, DOI: 10.1016/j.actamat.2014.09.028, (pp. 172-189, 18 total pages).

Rass, Stefan et al., "Licensed Processing of Encrypted Information", 2015 IEEE Conference on Communications and Network Security (CNS), Florence, Sep. 28-30, 2015, (pp. 703-704, 2 total pages).

International Search Report Corresponding to Application No. PCT/US2019/022052 dated Jun. 5, 2019.

* cited by examiner

SYSTEM AND METHOD TO PROTECT ITEMS ASSOCIATED WITH ADDITIVE MANUFACTURING

BACKGROUND

Some embodiments disclosed herein relate to industrial assets and, more particularly, to systems and methods to protect items associated with an additive manufacture of industrial asset items.

A customer might want to obtain an industrial asset item, such as a nozzle for a jet engine, a replacement part for a wind turbine, etc. In some cases, the customer might be able to have the part created by one of a number of different additive manufacturing platforms. Note that different additive manufacturing platforms might be associated with different prices, different turnaround times, etc. In some cases, an item designer or creator might transmit information to an additive manufacturing platform (e.g., a digital file defining the geometry of the item) so that the can be printed for the customer. The item designer might, however, be concerned that an unauthorized copy or alteration of this information might be used to create additional copies of the item. Such concerns can be especially worrisome when there are a relatively large number of customer, items, and/or additive manufacturing platforms. In addition, customers might be wary of obtaining items that have not been produced in accordance with pre-determined requirements (e.g., poorly designed parts, counterfeit items, etc.). It would therefore be desirable to provide systems and methods to efficiently and accurately facilitate creation of an industrial asset item.

SUMMARY

According to some embodiments, a system may include an additive manufacturing platform that provides additive manufacturing capability data. A customer platform, associated with a customer, may transmit an industrial asset item request for an industrial asset item. A digital transaction engine may receive the additive manufacturing capability data and the industrial asset item request. The digital transaction engine may then associate the industrial asset item request with an industrial asset definition file, and, based on the additive manufacturing capability data and the industrial asset definition file, assign the industrial asset item request to the additive manufacturing platform. The assignment of the industrial asset item request may be recorded via a secure, distributed transaction ledger. Responsive to the assignment, the additive manufacturing platform may create the industrial asset item (e.g., via an additive manufacturing printer) and provide the item to the customer.

Some embodiments comprise: means for receiving, at a digital transaction engine from an additive manufacturing platform, an indication of additive manufacturing capability data; means for receiving, at the digital transaction engine from a customer platform, associated with a customer, an industrial asset item request for the industrial asset item; means for associating the industrial asset item request with an industrial asset definition file; based on the additive manufacturing capability data and the industrial asset definition file, means for assigning the industrial asset item request to the additive manufacturing platform; and means for recording the assignment of the industrial asset item request via a secure, distributed transaction ledger.

Technical effects of some embodiments of the invention may include improved and computerized ways to efficiently and accurately facilitate creation of an industrial asset item. With these and other advantages and features that will become hereinafter apparent, a more complete understanding of the nature of the invention can be obtained by referring to the following detailed description and to the drawings appended hereto.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
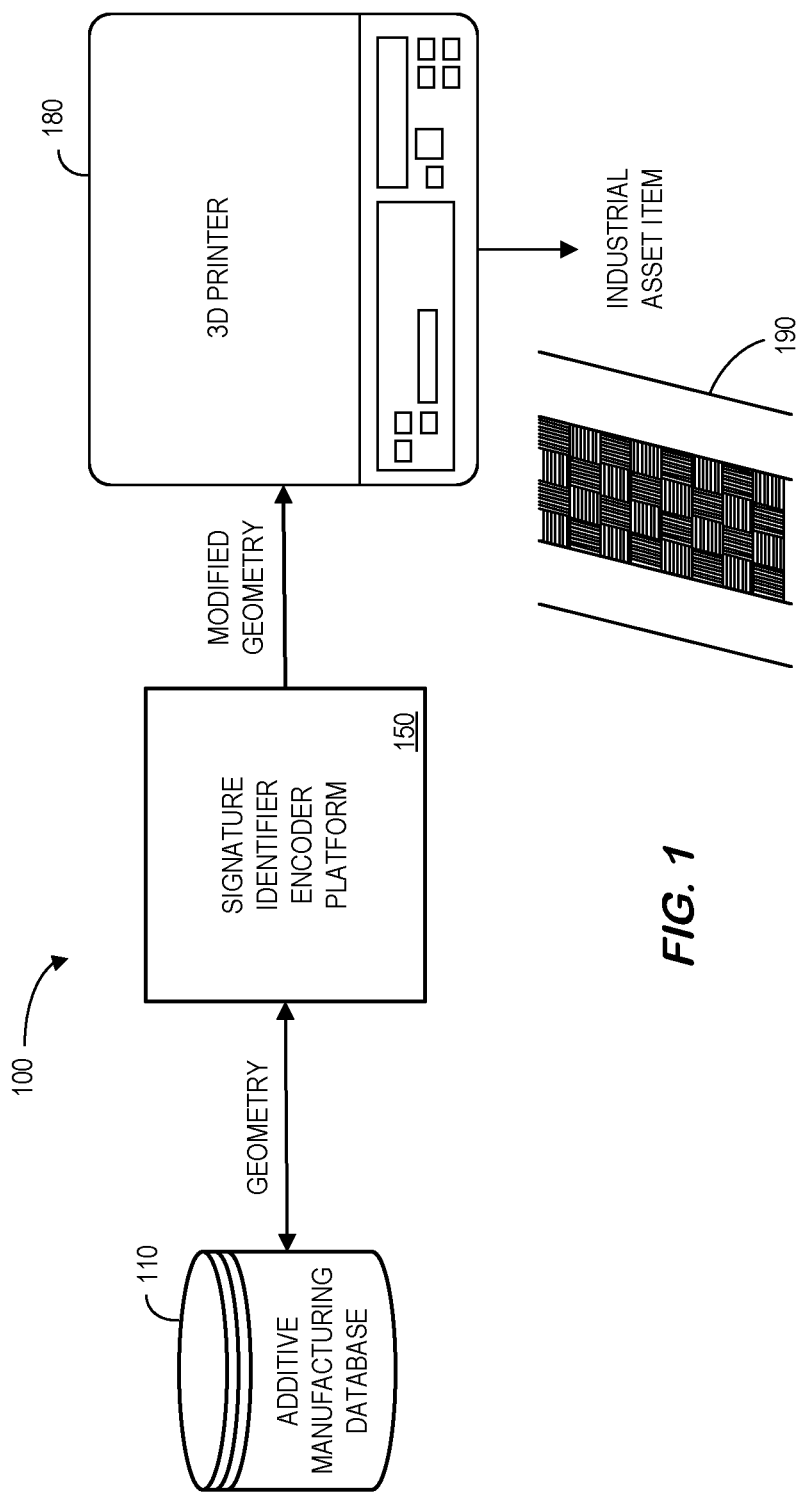
FIG. 1 is a high-level block diagram of a system according to some embodiments.

It may generally be desirable to efficiently and accurately facilitate creation of an industrial asset item. FIG. 1 is a high-level block diagram of a system according to some embodiments. In particular, the system 100 includes a signature identifier encoder platform 150 with a communication port to exchange information with an additive manufacturing database 110 (e.g., an item definition data store) and a three-dimensional printer 180 (e.g., associated with vat photopolymerization, material jetting, binder jetting, material extrusion, powder bed fusion, sheet lamination, directed energy deposition, etc.). According to some embodiments, the additive manufacturing database 170 stores electronic records defining the geometry of an industrial asset item 190. According to some embodiments, the signature identifier encoder platform 150 and/or other elements of the system may then record information about a transaction using a secure, distributed transaction ledger (e.g., via a blockchain verification process not illustrated in FIG. 1). For example, the signature identifier encoder platform 150 might record a printing date and time, a price, a bid, etc. via the secure, distributed transaction ledger in accordance with any of the embodiments described herein. According to some embodiments, the distributed ledger might be associated with the HYPERLEDGER® blockchain verification system. Note that the signature identifier encoder platform 150 could be completely de-centralized and/or might be associated with a third party, such as a vendor that performs a service for an enterprise.

The signature identifier encoder platform 150 might be, for example, associated with a Personal Computer ("PC"), laptop computer, a tablet computer, a smartphone, an enterprise server, a server farm, and/or a database or similar storage devices. According to some embodiments, an "automated" signature identifier encoder platform 150 may automatically determine a signature identifier and generate a modified geometry for an industrial asset item. As used herein, the term "automated" may refer to, for example, actions that can be performed with little (or no) intervention by a human.

As used herein, devices, including those associated with the signature identifier encoder platform 150 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The signature identifier encoder platform 150 may store information into and/or retrieve information from data stores. The data stores might, for example, store electronic records representing industrial asset item 190 geometries, modified geometries, etc. The data stores may be locally stored or reside remote from the signature identifier encoder platform 150. Although a single signature identifier encoder platform 150 is shown in FIG. 1, any number of such devices may be included. Moreover, various devices described herein might be combined according to embodiments of the present invention. In some embodiments, the signature identifier encoder platform 150, additive manufacturing database, and/or other devices might be co-located and/or may comprise a single apparatus. For example, the signature identifier encoder platform 150 might be associated with a single network cloud-hosted topology, a multiple network cloud-hosted topology, a participant hosted intranet environment, etc.

Figure 2:
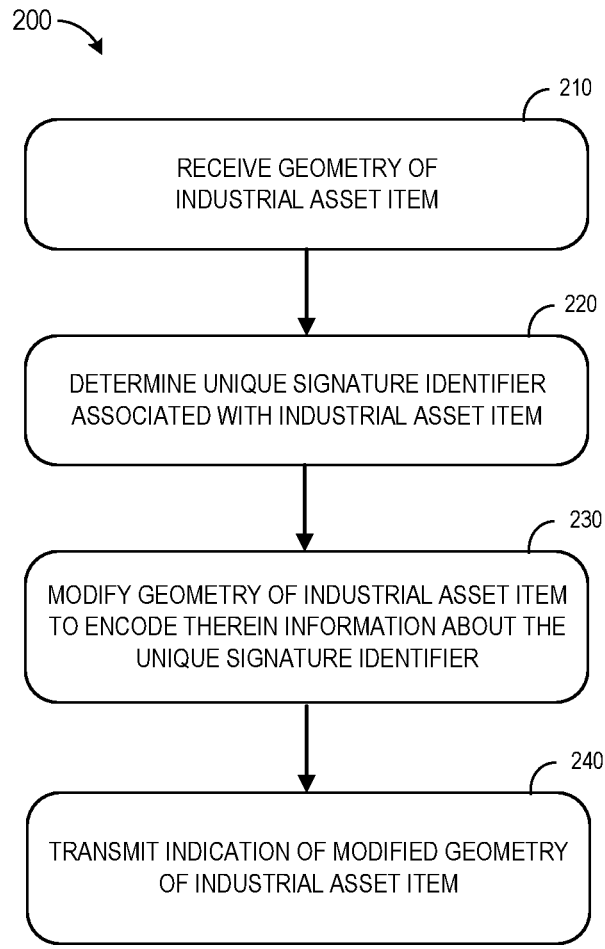
FIG. 2 is a method of encoding a signature identifier into an item in accordance with some embodiments.

In this way, the system 100 may efficiently and accurately facilitate creation of the industrial asset item 190. For example, FIG. 2 is a method 200 of encoding a signature identifier into an item in accordance with some embodiments. At 210, the geometry of an industrial asset item may be received. For example, the geometry might be received from an item definition data store containing electronic records defining the geometry of the industrial asset item. At 220, a signature identifier encoder platform may determine a unique signature identifier associated with the industrial asset item. The signature identifier might be globally unique, unique to a specific line of products, unique to a specific part, etc. The signature identifier might be generated by the signature identifier encoder platform or be received from another device or service.

At 230, the signature identifier encoder platform may modify the geometry of the industrial asset item to encode therein information about the unique signature identifier. At 240, the signature identifier encoder platform may transmit an indication of the modified geometry of the industrial asset item (e.g., by sending the data to a three-dimensional printer or storing the information back into an item definition data store). As used herein, the geometry of an item may be "modified" in any way to encode the signature identifier. Note that the modification of the item's geometry might not have any impact on the functional characteristics of the item (e.g., how the item distributes loads, how heat is dispersed, etc.).

Figure 3:
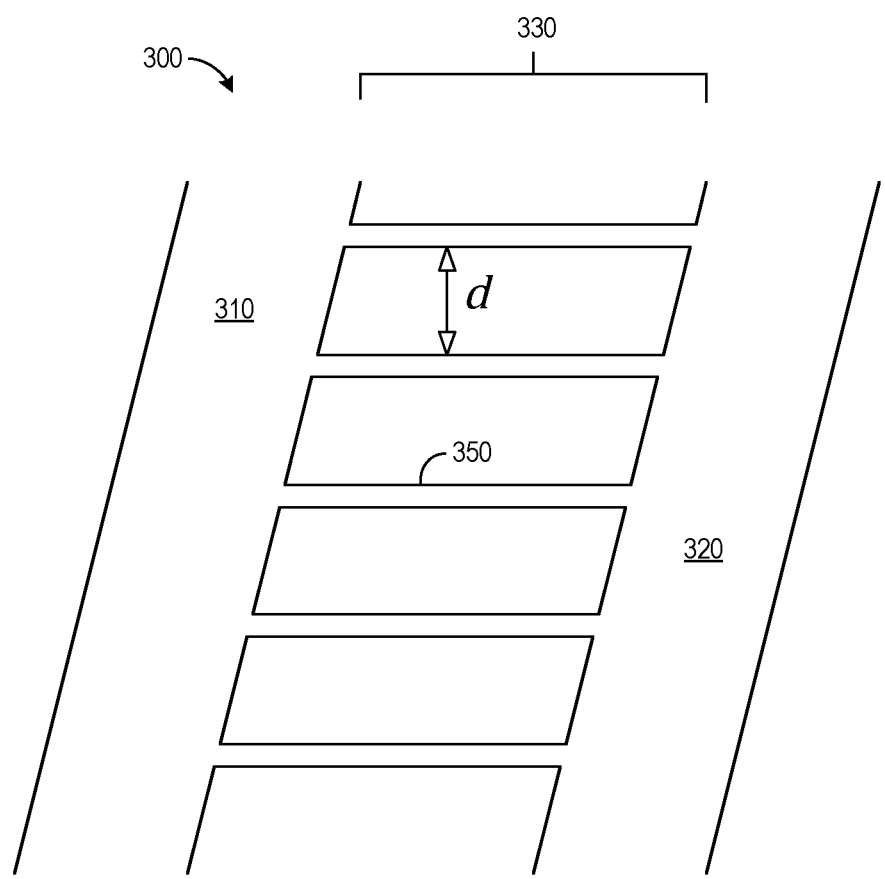
FIGS. 3 through 5 illustrate scanning patterns according to some embodiments.
Figure 4:
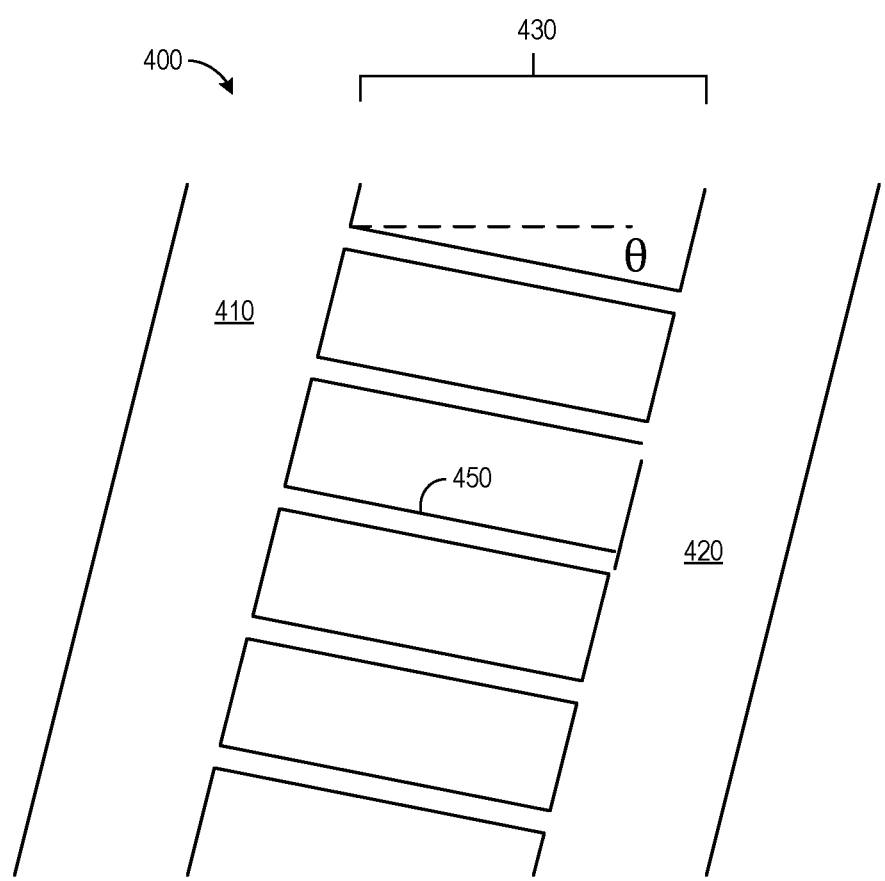

In some embodiments, the modification is an adjustment to a scanning pattern of a "fill region" of the industrial asset item. For example, FIG. 3 illustrates a horizontal slice of a scanning pattern of an item 300 having an Inside Mold Line ("IML") portion 310 and an Outside Mold Line ("OML") portion 320. Note that the item 300 might be defined as a series of such slices. Various fill techniques may be used to implement the interior geometry 330 between those portions 310, 320. In the example of FIG. 3, a stripe fill pattern may include structures 350 connecting the portions 310, 320 each separated by an interval d. According to some embodiments, the interior geometry 330 may be adjusted to encode therein the signature identifier of the item 300. For example, the width of each structure 350, the distance d, etc. might be adjusted to encode the signature identifier. As another example, FIG. 4 illustrates a scanning pattern of an item having an IML portion 410 and an OML portion 420. The interior geometry 430 includes stripe fill pattern may include structures 450 connecting the portions 410, 420 each angled at a hatch angle $\theta$. According to some embodiments, the interior geometry 430 may be adjusted to encode therein the signature identifier of the item 400. In this case, the hatch angle $\theta$ may be adjusted in addition the width of each structure 450, the distance between structures 450, etc. to encode the signature identifier.

Figure 5:
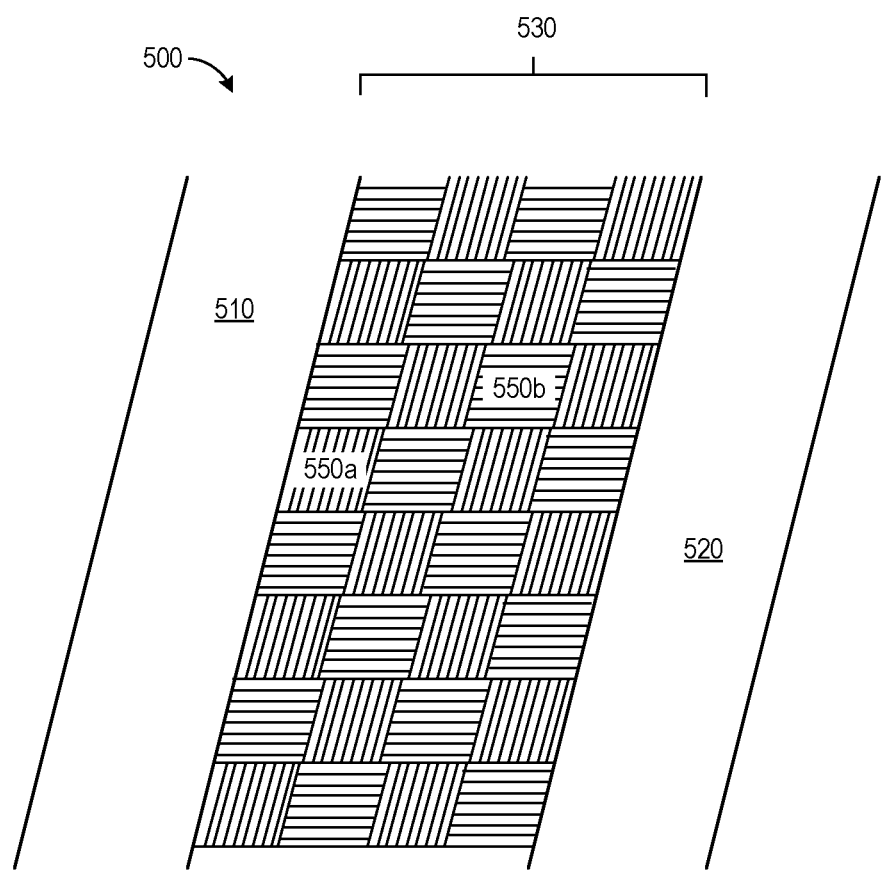

FIG. 5 illustrates a "checkerboard" or "chessboard" fill pattern for the interior geometry 530 of an item 500. In this example, the interior geometry 530 or core region between an IML portion 510 and an OML portion 520 comprises individual, alternating squares 550a, 550b. Instead of being arranged alternately, note that the squares 550a, 550b may be arranged in any other pattern (e.g., referred to as an "island" fill pattern). In general, embodiments may encode a signature identifier into an item's geometry by modifying some or all of hatch angles, hatching distances, overlaps in a fill pattern, gaps in fill pattern, etc. Note that any parameter used for encoding might change in relation to location within the industrial asset item. For example, the first digit of a signature identifier might be encoded near the bottom of the item while the last digit is encoded near the top of the item.

Figure 6:
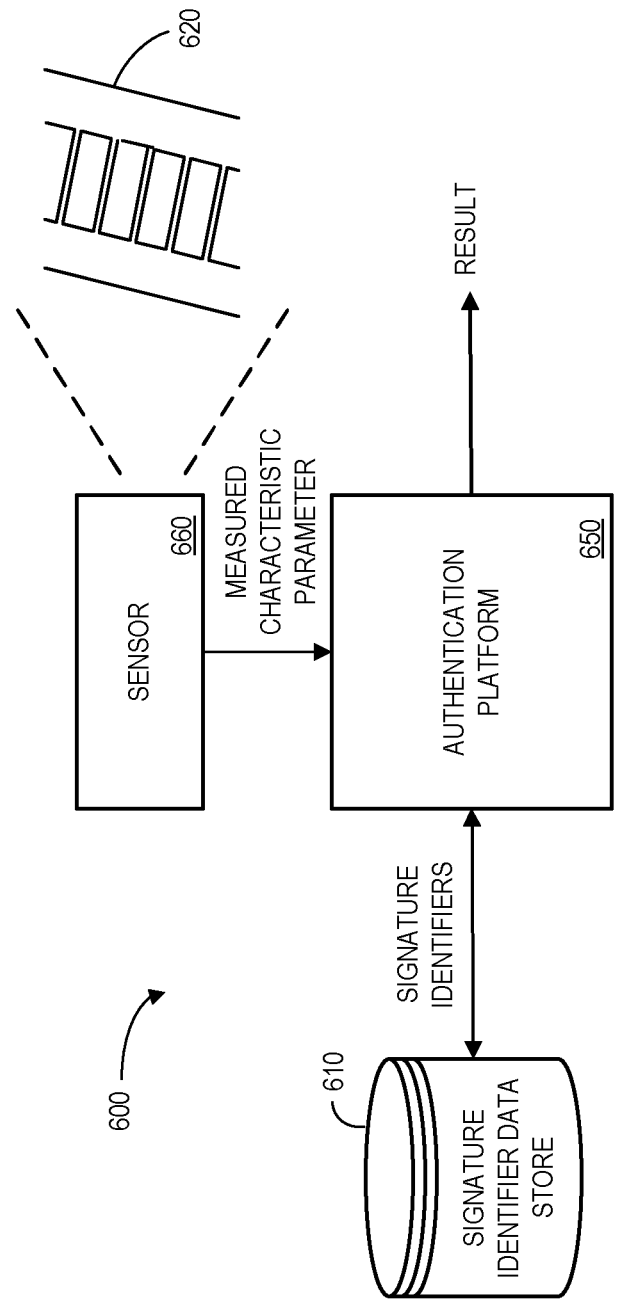
FIG. 6 is a high-level block diagram of a system that may be used to authenticate an item in accordance with some embodiments.

Once a signature identifier has been encoded into the geometric structure of a printed item, the existence of that structure may then be used to authenticate the item. For example, FIG. 6 is a high-level block diagram of a system 600 that may be used to authenticate an item in accordance with some embodiments. The system 600 includes a signature identifier data store 610 that may contain, for example, electronic records defining value signature identifiers along with any other relevant information about each item (e.g., a date of manufacture, a version number, a printer or process identifier, a quality review test result, etc.). An authentication platform 650 may access the signature identifier data store 610 and receive a measured characteristic parameter from a sensor 660, such as an electrical resistance, an X-ray value, a Computer Tomography ("CT") value, a sonogram value, etc. that is generated when the sensor 660 evaluates an item 620.

Figure 7:
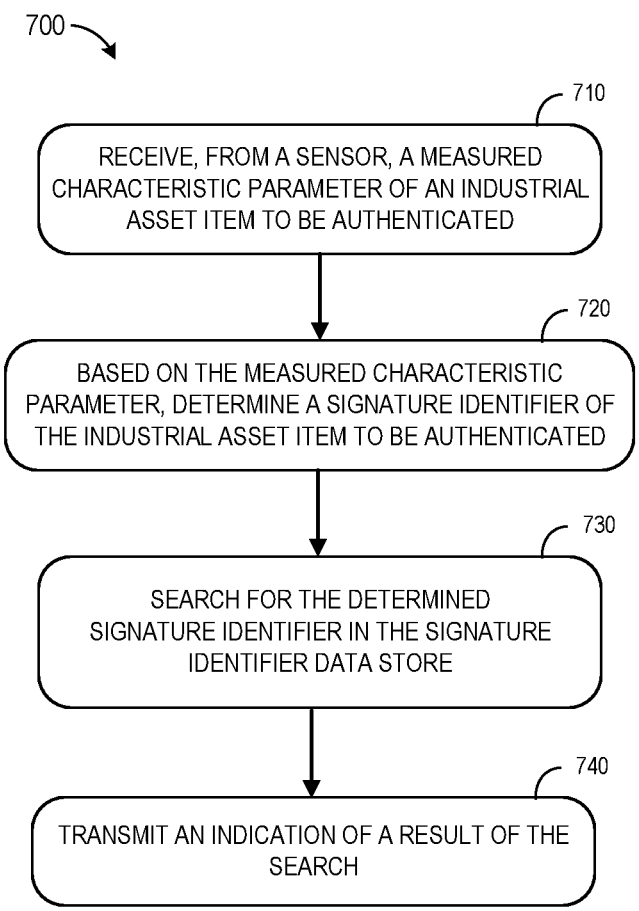
FIG. 7 is a method of authenticating an item according to some embodiments.

FIG. 7 is a method 700 of authenticating an item according to some embodiments. At 710, an authentication platform may receive, from a sensor, a measured characteristic parameter of an industrial asset item to be authenticated. At 720, the authentication platform may, based on the measured characteristic parameter, determine a signature identifier of the industrial asset item to be authenticated. For example, a particular electrical resistance might be translated into a signature identifier. At 730, the authentication platform may search for the determined signature identifier in a signature identifier data store (e.g., a database containing electronic records associating unique signature identifiers with industrial asset items) and transmit an indication of a result of the search at 740 (e.g., indicating if the item is authentic or inauthentic).

Figure 8:
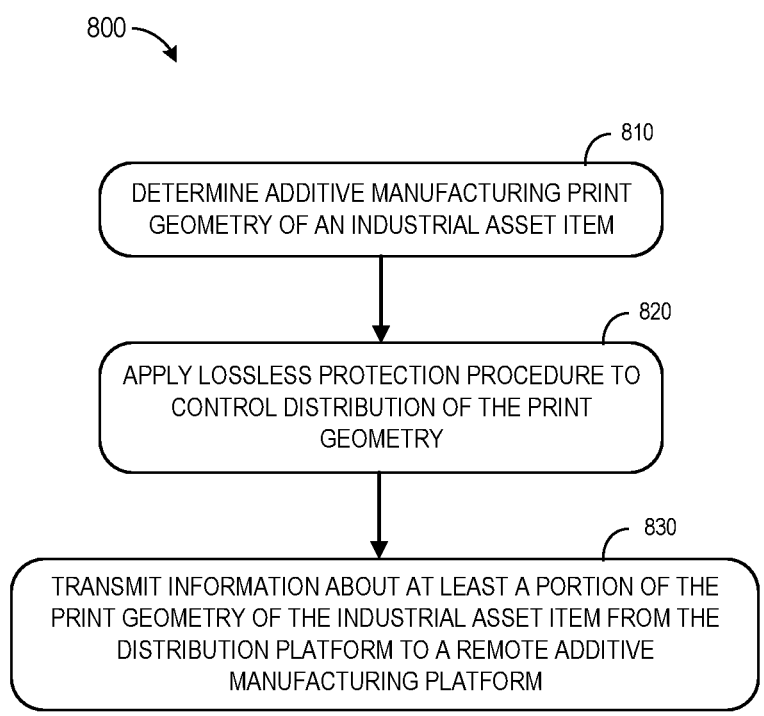
FIG. 8 is method associated with a protection procedure in accordance with some embodiments.

In addition to, or instead of, encoding signature identifiers into a printed item's geometry, not that other approaches may be used to protect the distribution of information associated with additive manufacturing. For example, FIG. 8 is method 800 associated with a protection procedure in accordance with some embodiments.

determining, by a computer processor of a distribution platform, an additive manufacturing print geometry of an industrial asset item. At 810, a distribution platform may determine an additive manufacturing print geometry of an industrial asset item. At 820, the system may apply a lossless protection procedure to control distribution of the print geometry. As a result, at 830 the system may transmit information about at least a portion of the print geometry of the industrial asset item from the distribution platform to a remote additive manufacturing platform.

Figure 9:
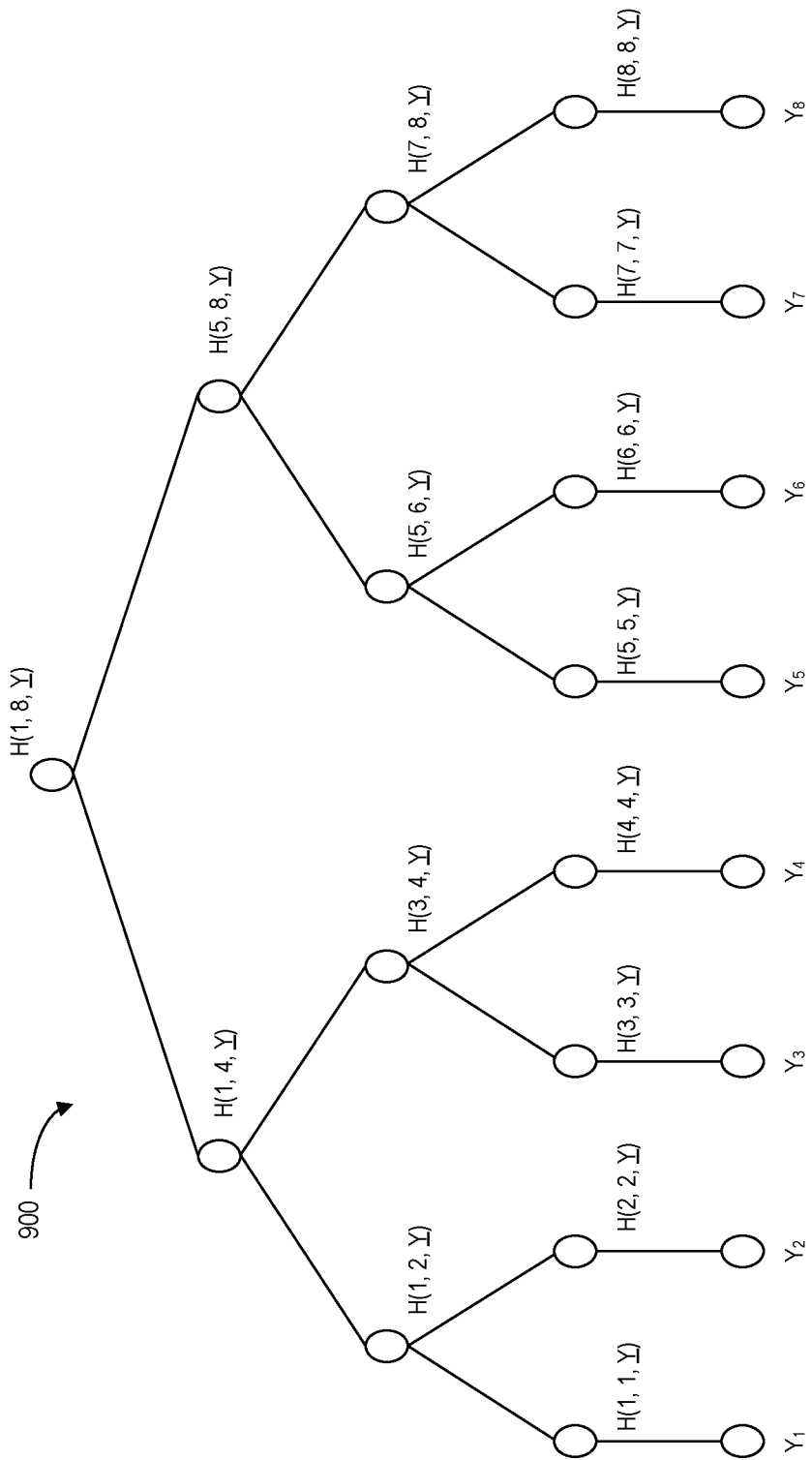
FIG. 9 illustrates a Merkle tree according to some embodiments.

By way of example, the lossless protection procedure might be associated with a "Merkle tree." FIG. 9 illustrates a Merkle tree 900 that may be used in a digital signature system where the security of the system depends on the security of a conventional cryptographic function. The tree 900 may provide a digital signature of the type which generates a secret number $X_i$, where $X_i = x_{i1}, x_{i2}, x_{i3} \ldots x_{in}$ computes $Y_i = F(X_i)$ and transmits part of $X_i$ to a receiver as the digital signature. According to some embodiments, the authentication tree 900 uses an authentication tree function comprising a one-way function of the $Y_i$. The root of the authentication tree and the authentication tree function may be authenticated at the receiver. The $Y_i$ and the corresponding authentication path values of the authentication tree may be transmitted from the transmitter to the receiver, and the $Y_i$ may be authenticated at the receiver by computing the authentication path of the authentication tree between the $Y_i$ and the rest of the authentication tree. In the example of FIG. 9, n is equal to 8.

To implement a "tree authentication" method for a vector of data items $Y = Y_1, Y_2, \ldots Y_n$ a method is provided to authenticate a randomly chosen $Y_i$. To authenticate the $Y_i$ define the function H(I, j, Y) as follows:

$$H(i,i,Y) = F(Y_i)$$

$$H(i,j,Y) = F(H(i, i+j-\tfrac{1}{2}, Y), H(i+j+1)/2, j, Y))$$

where $F(Y_i)$ is a one-way function. H(i, j, Y) is a one-way function of $Y_i, Y_{i+1}, \ldots Y_j$ and H(1, n, Y) can be used to authenticate $Y_1$ through $Y_n$. H(1, n, Y) is a one-way function of all the $Y_i$, (H(1, n, Y) might comprise, by way of example only, 100 bits of data). In this way, a receiver may selectively authenticate any "leaf," Yi, of the binary tree 900 defined with the function H(i, n, Y).

For example, the sequence of recursive calls required to compute the root, H(1, 8, Y) of the binary tree 900 is shown in FIG. 9. Once the root H(1, 8, Y) is computed, it is authenticated to the receiver along with the function H( ). To authenticate any $Y_i$, such as $Y_5$, the transmitter and receiver may perform the following:

(a) H(1, 8, Y) is already known and authenticated.

(b) H(1, 8, Y)=F(H(1, 4, Y), H(5, 8, Y)). Send H(1, 4, Y) and H(5, 8, Y) and let the receiver compute H(1, 8, Y)=F (H(1, 4, Y), H(5, 8, Y)) and confirm H(5, 8, Y) is correct.

(c) The receiver has authenticated H(5, 8, Y). Send H(5, 6, Y) and H(7, 8, Y) and let the receiver compute H(5, 8, Y)=F(H(5, 6, Y), H(7, 8, Y)) and confirm H(5, 6, Y) is correct.

(d) The receiver has authenticated H(5, 6, Y). Send H(5, 5, Y) and H(6, 6, Y) and let the receiver compute H(5, 6, Y)=F(H(5, 5, Y), H(6, 6, Y)) and confirm H(5, 5, Y) is correct.

(e) The receiver has authenticated H(5, 5, Y). Send $Y_5$ and let the receiver compute H(5, 5, Y)=F($Y_5$) and confirm it is correct.

(f) The receiver has authenticated $Y_5$.

Once such a Merkle tree 900 is created (of a digital file representing the additive manufacturing print geometry), a computer processor of a distribution platform may split the digital file into sub-segments. The distribution platform may then encrypt the first sub-segment using a public key associated with a particular remote additive manufacturing platform and transmit the encrypted first sub-segment that platform. The remote additive manufacturing platform may then decrypt the first sub-segment using a private key. As a result, the remote additive manufacturing platform may produce a hash of the decrypted first sub-segment to indicate authorization to receive a second sub-segment via validation by the Merkle root hash tree 900.

As another example, the lossless protection procedure might have the distribution platform encrypt a digital file using a public key associated with a known client list. A client (e.g., a remote additive manufacturing platform) may then decrypt the digital file using a private key stored in a "secure hardware enclave." The secure hardware enclave might comprise, for example, an on-chip identifier stored in a tamper proof container. As still another example, the lossless protection procedure might have the distribution platform create a Merkle root hash of a digital file representing the additive manufacturing print geometry. The distribution platform may then encrypt the digital file using the Merkle root hash.

Figure 10:
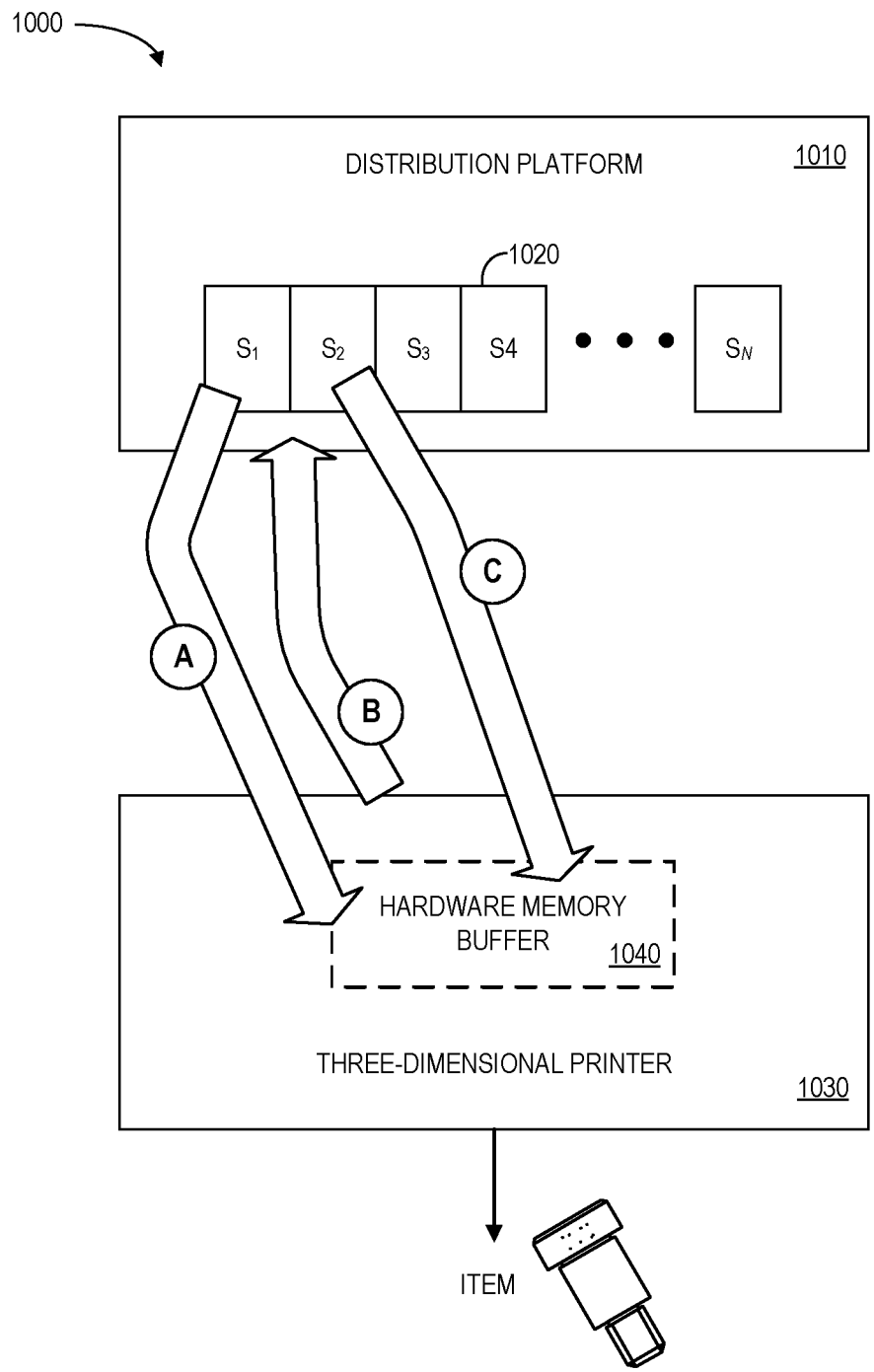
FIG. 10 is a system wherein an additive manufacturing platform indicates when a sub-segment has been printed and erased in accordance with some embodiments.

As yet another example, the lossless protection procedure might be associated with a particular type of three-dimensional computer hardware or software. For example, FIG. 10 is a system 1000 wherein an additive manufacturing platform (three-dimensional printer 1030) indicates when a sub-segment has been printed and erased in accordance with some embodiments. In this case, a distribution platform 1010 may divide a print geometry file 1020 into sub-segments ($S_1$ through $S_N$ as illustrated in FIG. 10). At (A), the distribution platform transmits a first sub-segment to the additive manufacturing platform 1030 which store the data into a hardware memory buffer 1040. After the printer 1030 has created that portion of the item, the hardware memory buffer is erased (e.g., a bulk memory erase may be performed or a hardware signal might trigger the deletion of data). The printer 1030 then indicates to the distribution platform 1010 that the data no longer exists. Responsive to that indication, the distribution platform may transmit the next sub-segment and the process may repeat until the entire print geometry file has been consumed by the printer 1030 (at which point the item is created). In this way, the distribution platform 1010 may feel comfortable that the additive manufacturing platform was never in possession of the entire print geometry file (making theft of the whole part design impractical).

Figure 11:
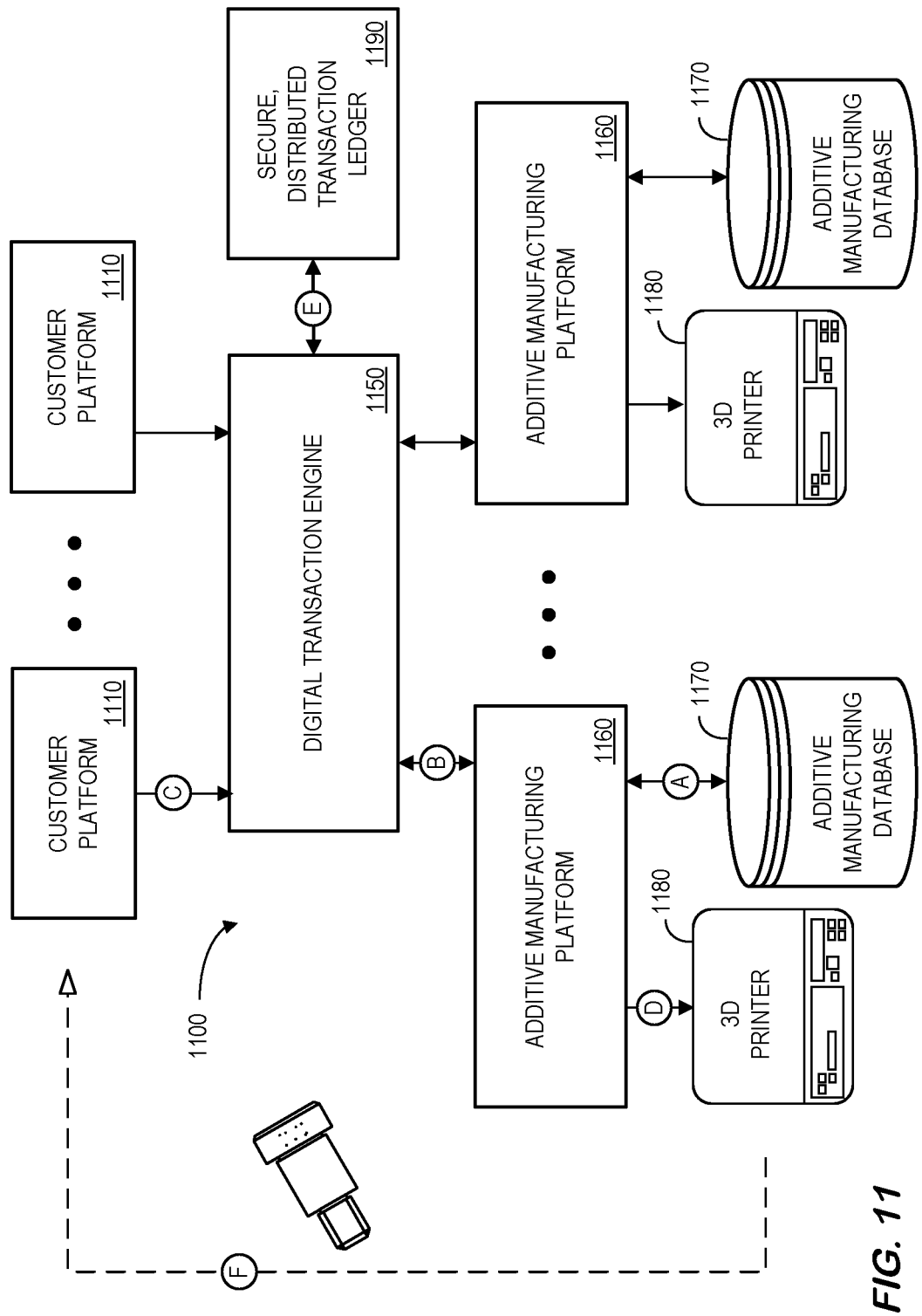
FIG. 11 is a high-level block diagram of a digital transaction system according to some embodiments.

Embodiments described herein may be implemented in any number of different network transaction environments. For example, FIG. 11 is a high-level block diagram of a system 1100 according to some embodiments. In particular, the system 1100 includes a digital transaction engine 1150 with a communication port to exchange information with a number of customer platforms 1110. According to some embodiments, the digital transaction engine 1150 receives an industrial asset item request from one of the customer platforms 1110 and assigns the request to one of a number of additive manufacturing platforms 1160. Each additive manufacturing platform 1160 might include and/or be associated with an additive manufacturing database 1170 (e.g., storing a printer version number, a maximum resolution of a printer, powder specifics, a minimum turnaround time for a newly received job, etc.) and a three-dimensional printer 1180. According to some embodiments, the digital transaction engine 1150 and/or other elements of the system may then record information about the transaction using a secure, distributed transaction ledger 1190 (e.g., via a blockchain verification process). For example, the digital transaction engine 1150 might record an order date and time, a price, a bid, etc. via the secure, distributed transaction ledger 1190 in accordance with any of the embodiments described herein. According to some embodiments, the distributed ledger might be associated with the HYPERLEDGER® blockchain verification system. Note that the digital transaction engine 1150 could be completely de-centralized and/or might be associated with a third party, such as a vendor that performs a service for an enterprise.

The digital transaction engine 1150, customer platform 1110, and/or additive manufacturing platform 1160 might be, for example, associated with a PC, laptop computer, a tablet computer, a smartphone, an enterprise server, a server farm, and/or a database or similar storage devices. According to some embodiments, an automated digital transaction engine 1150 may automatically provide a service for the customer platform 1110 and record information via a distributed ledger (e.g., via a blockchain verification process).

In this way, the system 1100 may efficiently and accurately facilitate creation of an industrial asset item. For example, at (A) the additive manufacturing platform 1160 may obtain additive manufacturing capability data from the additive manufacturing database 1170 and provide that information to the digital transaction engine 1150 at (B). At (C), the customer platform 1110 may transmit an industrial asset item request to the digital transaction engine 1150. The digital transaction engine 1150 may then assign the request one of the additive manufacturing platforms 1160 (e.g., by transmitting a definition file, including a geometry that has been modified based on a signature identifier, to a platform 1160). The additive manufacturing platform 1160 can then communicate with the three-dimensional printer 1180 at (D) to initiate a printing process. Note that each step or subset of the steps of the transaction may be recorded in the secure, distributed transaction ledger 1190 at (E). When created, the completed item with the encoded signature identifier may be provided to the customer at (F) (as illustrated by the dashed arrow in FIG. 11).

Figure 12:
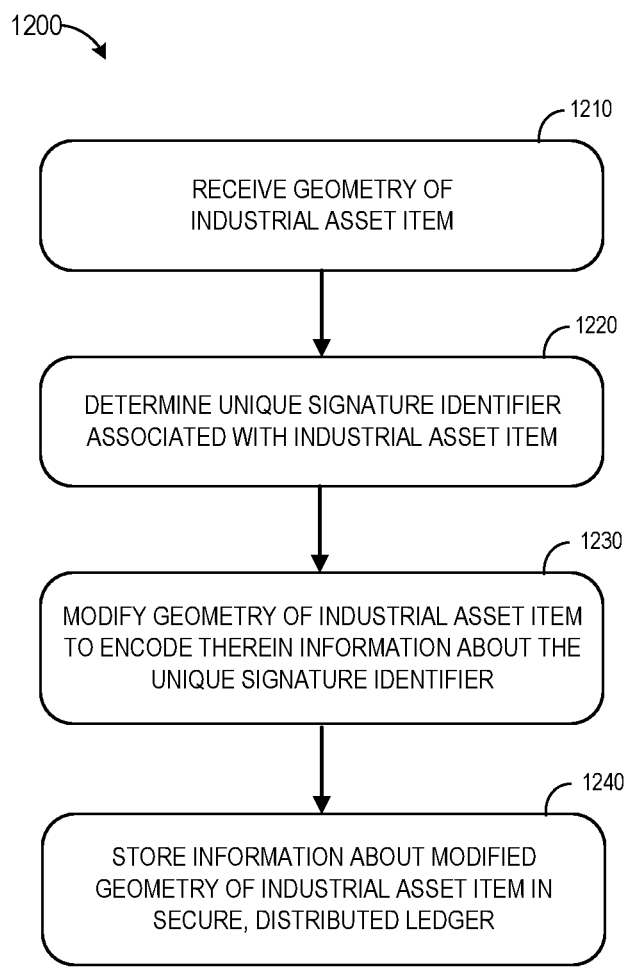
FIG. 12 is a method that may be associated with an additive manufacturing platform in accordance with some embodiments.

Note that the system 1100 of FIG. 11 is provided only as an example, and embodiments may be associated with additional elements or components. According to some embodiments, the elements of the system 1100 automatically facilitate creation of an industrial asset item for a customer. For example, FIG. 12 illustrates a method 1200 that might be performed by the digital transaction engine 1150 and/or other elements of the system 1100 described with respect to FIG. 11, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At 1210, the geometry of an industrial asset item may be received. For example, the geometry might be received from an item definition data store containing electronic records defining the geometry of the industrial asset item. At 1220, a signature identifier encoder (e.g., at a digital transaction engine) may determine a unique signature identifier associated with the industrial asset item. The signature identifier might be globally unique, unique to a specific line of products, unique to a specific part, etc. The signature identifier might be generated by the signature identifier encoder platform or be received from another device or service.

At 1230, the signature identifier encoder platform may modify the geometry of the industrial asset item to encode therein information about the unique signature identifier (e.g., by adjusting a scanning pattern fill region). At 1240, information about the signature identifier may be stored in a secure, distributed ledger. The modified geometry file may also be transmitted to a three-dimensional printer, including, for example, those described in the American Society for Testing and Materials ("ASTM") group "ASTM F42—Additive Manufacturing" standards. These include vat photopolymerisation (using a vat of liquid photopolymer resin), material jetting (where material is jetted onto a build platform), binder jetting (e.g., using a powder based material and a binder), material extrusion such as Fuse Deposition Modelling ("FDM"). powder bed fusion (e.g., Direct Metal Laser Sintering ("DMLS"), Electron Beam Melting ("EBM"), etc.), a sheet lamination (including Ultrasonic Additive Manufacturing ("UAM") and Laminated Object Manufacturing ("LOM")), and Directed Energy Deposition ("DED"). Note that a digital industrial asset geometry file might comprise a Computer Aided Design ("CAD") file (e.g., defining a gear, a fuel nozzle, etc.), an image, a manufactured design, a cross-section, etc.

Thus, in some embodiments a digital transaction engine may record information via a secure, distributed transaction ledger at 1240 (e.g., associated with blockchain technology). According to some embodiments, transactions recorded using blockchain technology might include information about an item quote, a signature identifier, a modified geometry, a bid, an award selection, manufacturing capability sharing, an engineering model generation, engineering model distribution, additive raw material procurement, supply, and readying, component manufacture, component inspection, component supply, a payment transaction (e.g., including micro-payments and cryptographic payment systems such as bitcoin), etc.

According to some embodiments, a digital transaction engine communicates with a plurality of additive manufacturing platforms (at least some of which have differing additive manufacturing capability data) and/or a plurality of customer platforms requesting different industrial asset items. Note that a digital transaction engine might be associated with a single network cloud-hosted topology, a multiple network cloud-hosted topology, and/or a participant hosted intranet environment.

Figure 13:
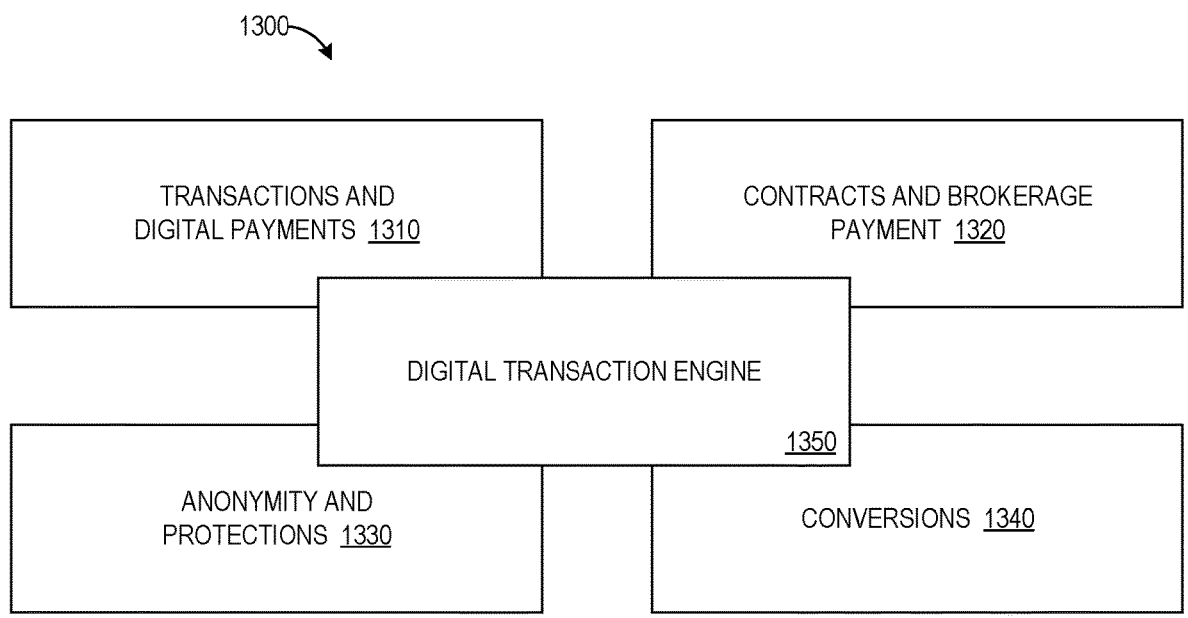
FIG. 13 illustrates elements of a phased approach to core digital transaction technology in accordance with some embodiments.

FIG. 13 illustrates elements of a phased approach 1300 to core digital transaction technology in accordance with some embodiments. In particular, the approach 1300 might initially provide for transactions and/or digital payments 1310 for a digital transaction engine 1350. This might provide the underlying structure of a digital ecosystem for the creation of industrial asset items. The approach 1300 might then provide for smart contracts and/or brokerage payment 1320 and anonymity and protections 1330. For example, cryptocurrency might be used to create an opaque marketplace where identities are protected (as opposed to a transparent marketplace). Finally, the conversions 1340 may provide strong encryption for the precise control of advanced three-dimensional printing technologies, equipment, intellectual property protection (e.g., in connection with signature identifiers or any other approach described herein), supply chain and pedigree histories, etc. As a result, counterfeit parts may be reduced and encrypted keys can be used to control access to equipment, build files, production volume and service contracts, etc. Mover, the system may be able to publish encrypted pedigree and transaction data to the distributed ledger to help control knowledge flow from design, modeling, simulation, and manufacture through contractual services. For example, certified build data (e.g., describing a build process or a three-dimensional printer manufacturer), certified design data (e.g., identifying a particular industrial asset item designer), and/or certified powder data (e.g., identifying an entity that supplied the powder used to create an industrial asset item).

Figure 14:
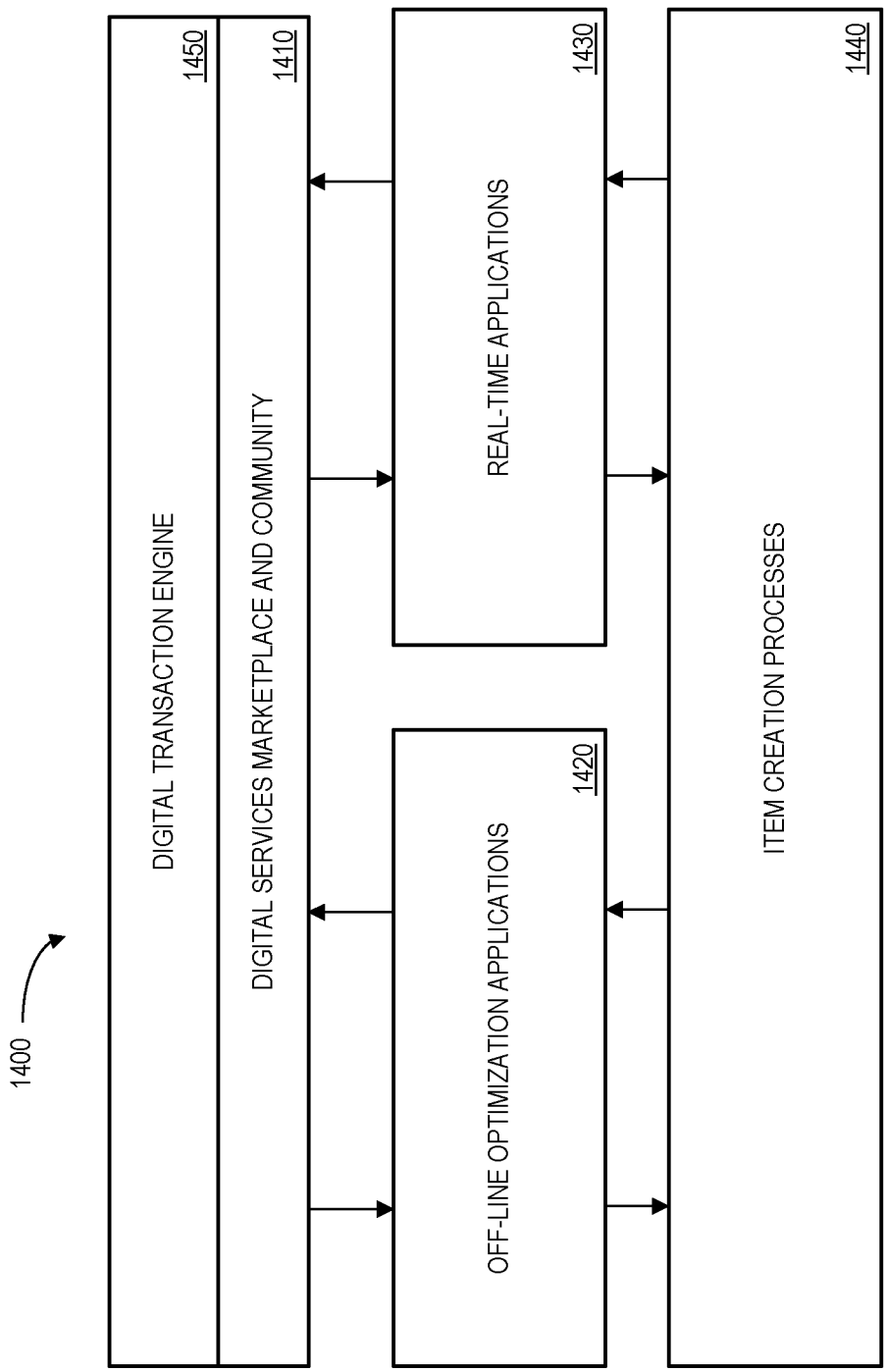
FIG. 14 is a block diagram of an additive digital ecosystem according to some embodiments.

FIG. 14 is a block diagram of an additive digital ecosystem 1400 according to some embodiments. The ecosystem 1400 includes a digital transaction engine 1450 that communicates with off-line optimization applications 1420 and real-time applications 1430 via a digital services marketplace and community. The digital transaction engine 1450 might be associated with, for example, a content distribution and access management toolchain, system-level optimization, and/or multi-disciplinary optimization. The off-line optimization applications 1420 might include design applications, manufacturing planning applications, scan path generation applications (e.g., in connection with signature identifiers), etc. The real-time applications 1430 might include, for example, machine controls, in-line inspection, factory visualization, etc. Note that the off-line optimization applications 1420 and/or real-time applications 1430 might support various item creation processes such as design, manufacturing planning, scan path generation, build, in-line inspection, part creation, post-process inspection, etc. An item creation process 1440 might interact, for example, with the off-line optimization applications 1420 and/or real-time applications 1430 to facilitate creation of an industrial asset item. In this way, the ecosystem 1400 may provide improved outcomes (e.g., reducing design changes to a day or less, a self-optimized build process, individualized part lifing and performance, etc.).

Figure 15:
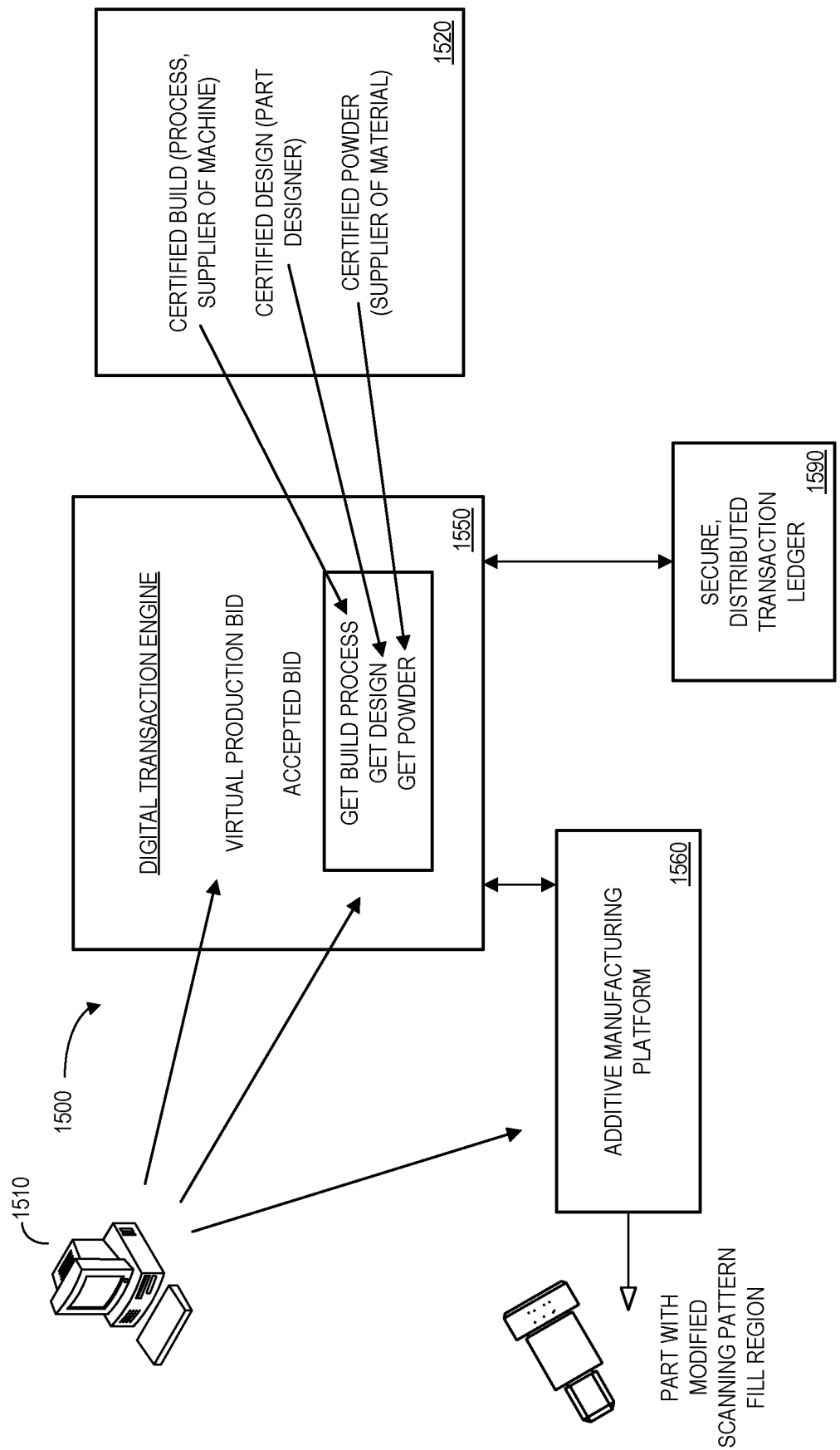
FIG. 15 is an additive part production chain enabled by a digital transaction engine in accordance with some embodiments.

FIG. 15 is an additive part production chain 1500 enabled by a digital transaction engine in accordance with some embodiments. Again, a digital transaction engine 1550 may receive an industrial asset item request from a customer platform 1510. The digital transaction engine 1550 may assign the request to an appropriate additive manufacture platform 1560 to create the item so that it can be provided to the customer who requested it. Some or all of these steps might be recorded in a secure, distributed transaction ledger 1590 (e.g., blockchain technology). Note that the customer might submit a "brokered buy" to the digital transaction engine 1550 (which can then determine that a virtual production bid is accepted and used to initiate a build process, obtain the needed design, obtain required raw materials, modify a geometry in view of a unique signature identifier, etc.). In other embodiments, a customer might instead send a "direct buy" to the additive manufacturing platform 1560. Moreover, in some embodiments, a design platform 1520 may arrange for a certified build, design, powder, etc.

Thus, embodiments may facilitate distribution of intellectual property (e.g., engineering models and data packages for manufacture using additive manufacturing technology) in ways that protect a distribution platform and customers. Moreover, distributed ledger transactions may be used to effect and verify transactions between end users (e.g., customer, manufacturer, etc.) and seller/lessors of intellectual property (e.g., engineering models, technical data packages, processing conditions, inspection data, etc.) directly or through electronic intermediaries such as digital marketplaces. In addition, embodiments may provide a process for the distribution of electronic data files through a single transaction (or series of transactions) via the use of blockchain distributed ledger technology. According to some embodiments, two or more parties may use the distributed ledger technology to record the economic exchange of information necessary for the manufacture of additive manufactured components. For each intermediate step in the exchange of technical information (e.g., including: quote, bid or award selection; manufacturing capability sharing; engineering model generation; engineering model distribution; additive raw material procurement, supply and readying; component manufacture; component inspection; component supply; and payment) a corresponding transaction may be created. These transactions might be published in part (or in whole) to the distributed ledger in un-encrypted or encrypted form as a means of providing an online pedigree of the manufactured component to interested parties.

For a number of different reasons (such as the spread of industrially relevant additive manufacturing printing hardware, the increasing specification of additive manufacturing process to manufacture components, etc.) it may become economically advantageous to make available digital files (containing intellectual property) to end users for the manufacture of components that are not in-house or captive component suppliers. Therefore, it may be desirable to perform such transactions in a secure manner such that these digital engineering files and manufacturing process techniques remain secure. Creation of a digital ecosystem with strong encryption for the precise control of advanced three-dimensional printing technology, equipment, intellectual property, manufacturing, supply chain and pedigree histories based upon the use of a distributed ledger (e.g., a blockchain technology) may be provided in accordance with some embodiments described herein.

In order to protect the intellectual property required to manufacture components, requisite build files (e.g., engineering models, scan paths, etc.) and associated details (material specifications, lot data, machine specifications, process conditions, etc.) may be managed as described herein so as to secure the integrity of the data and limit theft (while still ensuring the production of high quality components using validated techniques). Finally, a validation mechanism may help verify authenticity of manufactured components while also protecting data rights.

Figure 16:
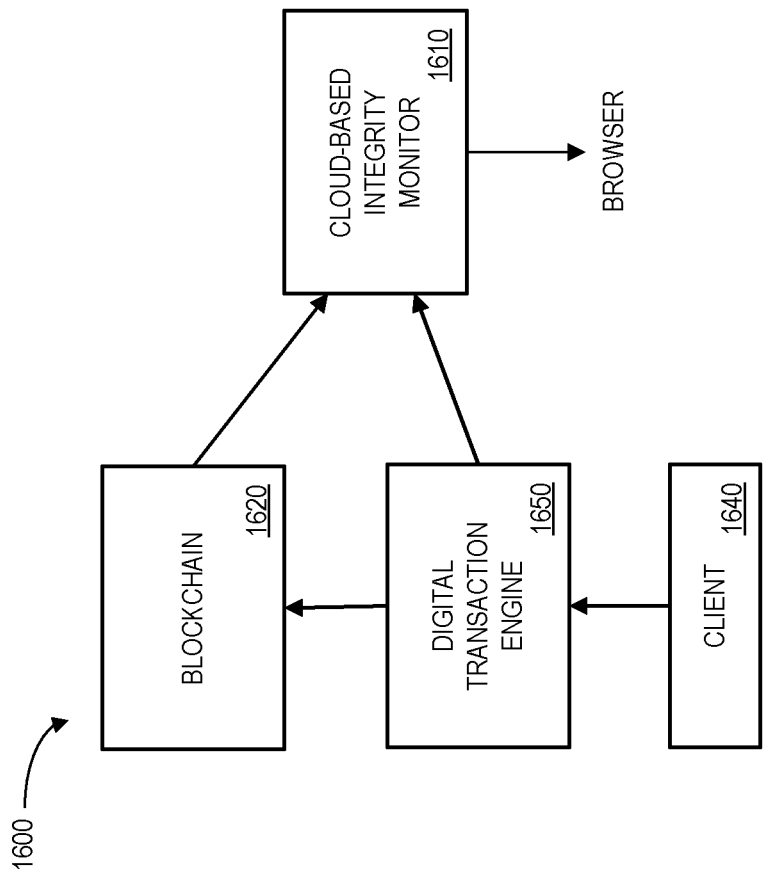
FIG. 16 is a system implementing a digital transaction with blockchain validation according to some embodiments.
Figure 17:
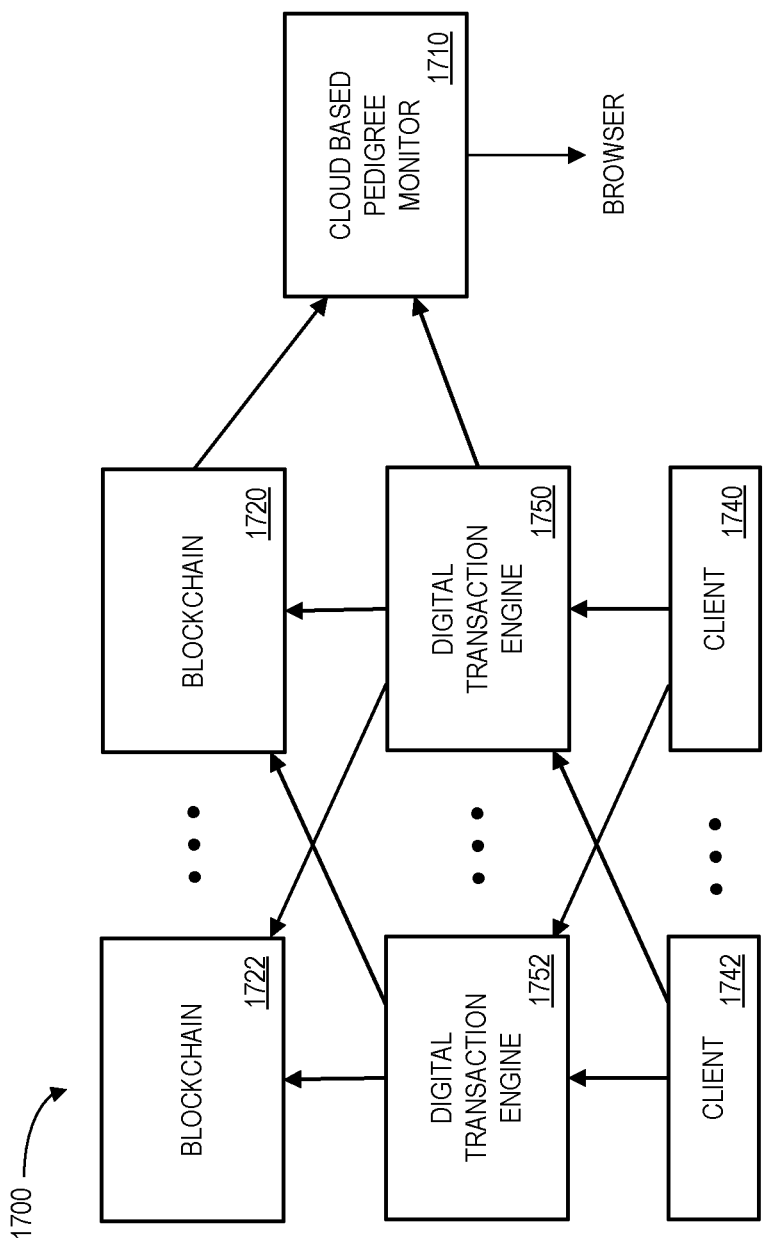
FIG. 17 is a system implementing a digital transaction with multiple digital transaction engines in accordance with some embodiments.

FIG. 16 is a system 1600 implementing a digital transaction incorporating blockchain validation according to some embodiments. A cloud-based integrity monitor 1610 may provide transaction integrity data via a web browser and exchange information with a blockchain 1620 and a digital transaction engine 1650 via Representational State Transfer ("REST") web services. The REST web services may, for example, provide interoperability between computer systems on the Internet (e.g., by allowing requesting systems to access and manipulate textual representations of web resources using a uniform, predefined set of stateless operations). According to some embodiments, portions of the digital transaction engine 1650 may be associated with a MySQL database. In this way, the digital transaction engine 1650 and blockchain 1620 can be used to provide transaction level verification for a client 1640. Although FIG. 16 illustrates a system 1600 with a single blockchain 1620 and digital transaction engine 1650, note that embodiments may employ other topologies. For example, FIG. 17 is a system 1700 implementing a digital transaction incorporating multiple digital transaction engines in accordance with some embodiments. In particular, an additional blockchain 1722 and digital transaction engine 1752 may provide protection for an additional client 1742. As illustrated in FIG. 17, each digital transaction engine 1750, 1752 may be associated with multiple blockchains 1720, 1722 providing additional protection for the system 1700 (e.g., by storing information at multiple, geographically disperse nodes making attacks impractical). That is, each verifier (e.g., digital transaction engine) may commit a brief summary to an independent data store and, once recorded, the information cannot be changed without detection to provide a tamper-proof System of Records ("SoR").

Figure 18:
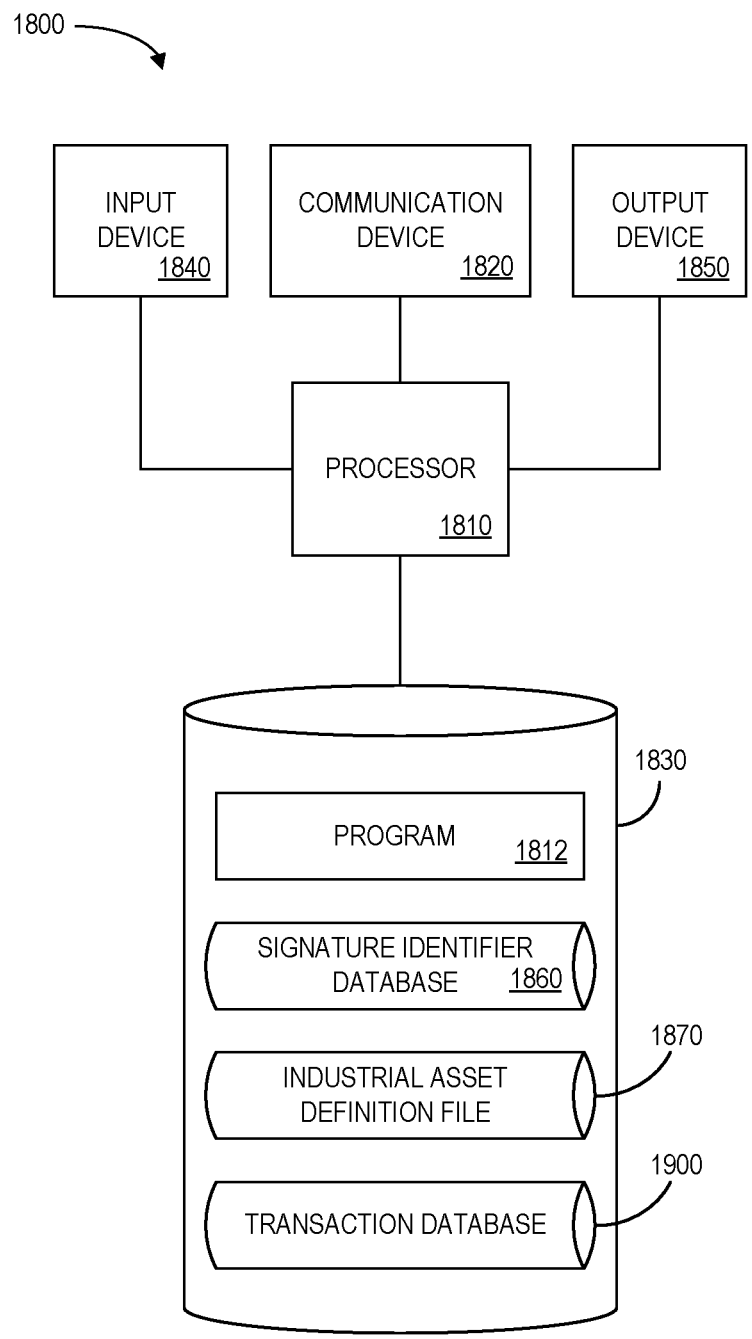
FIG. 18 illustrates a platform according to some embodiments.

Embodiments described herein may comprise a tool that facilitates creation of an industrial asset item and may be implemented using any number of different hardware configurations. For example, FIG. 18 illustrates a platform 1800 that may be, for example, associated with the systems 180, 1800 of FIGS. 1 and 18, respectively (as well as other systems described herein). The platform 1800 comprises a processor 1810, such as one or more commercially available Central Processing Units ("CPUs") in the form of one-chip microprocessors, coupled to a communication device 1820 configured to communicate via a communication network (not shown in FIG. 18). The communication device 1820 may be used to communicate, for example, with one or more remote platforms. Note that communications exchanged via the communication device 1820 may utilize security features, such as those between a public internet user and an internal network of an insurance enterprise. The security features might be associated with, for example, web servers, firewalls, and/or PCI infrastructure. The platform 1800 further includes an input device 1840 (e.g., a mouse and/or keyboard to enter information about a distributed ledger, a design file, etc.) and an output device 1850 (e.g., to output pedigree reports, generate production status messages, etc.).

The processor 1810 also communicates with a storage device 1830. The storage device 1830 may comprise any appropriate information storage device, including combinations of magnetic storage devices (e.g., a hard disk drive), optical storage devices, mobile telephones, and/or semiconductor memory devices. The storage device 1830 stores a program 1812 and/or network security service tool or application for controlling the processor 1810. The processor 1810 performs instructions of the program 1812, and thereby operates in accordance with any of the embodiments described herein. For example, the processor 1810 may apply a lossless protection procedure to control distribution of a print geometry of an industrial asset item. In some embodiments, the processor 1810 may determine a unique signature identifier associated with the industrial asset item and modify the geometry of the industrial asset item to encode therein information about the unique signature identifier. In some cases, for example, this may be done by having the processor 1810 adjust a scanning pattern of a fill region (e.g., stripe, checkerboard, etc.) or a support structure of the industrial asset item. The processor 1810 may also receive, from a sensor (e.g., an X-ray), a measured characteristic parameter of an item to be authenticated and determine a signature identifier of the item (which can be used to authenticate the item).

The program 1812 may be stored in a compressed, uncompiled and/or encrypted format. The program 1812 may furthermore include other program elements, such as an operating system, a database management system, and/or device drivers used by the processor 1810 to interface with peripheral devices.

As used herein, information may be "received" by or "transmitted" to, for example: (i) the platform 1800 from another device; or (ii) a software application or module within the platform 1800 from another software application, module, or any other source.

In some embodiments (such as shown in FIG. 18), the storage device 1830 further stores a signature identifier database 1860, industrial asset definition files 1870, and a transaction database 1900. An example of a database that might be used in connection with the platform 1800 will now be described in detail with respect to FIG. 19. Note that the database described herein is only an example, and additional and/or different information may be stored therein. Moreover, various databases might be split or combined in accordance with any of the embodiments described herein. For example, the transaction database 1900 and industrial asset definition files 1870 might be combined and/or linked to each other within the program 1812.

Figure 19:
FIG. 19 is a portion of a tabular transaction database in accordance with some embodiments.

Referring to FIG. 19, a table is shown that represents the transaction database 1900 that may be stored at the platform 1800 in accordance with some embodiments. The table may include, for example, entries identifying transactions associated with the creation of items for customers. The table may also define fields 1902, 1904, 1906, 1908, 1910, 1912, 1914 for each of the entries. The fields 1902, 1904, 1906, 1908, 1910, 1912, 1914 may, according to some embodiments, specify: transaction identifier 1902, a customer platform identifier 1904, a date and time 1906, a status 1908, a blockchain result 1910, a signature identifier 1912, and an industrial asset definition file 1914. The transaction database 1900 may be created and updated, for example, based on information electrically received from remote customer platforms, additive manufacturer platforms, and/or distributed ledger devices.

The transaction identifier 1902 may be, for example, a unique alphanumeric code identifying a transaction (or sub-step of a transaction) being executed by a digital transaction engine. The customer platform identifier 1904 might indicate the customer who initiated the transaction by requesting the part. The date and time 1906 might indicate when the particular sub-step was completed and recorded in a ledger. The status 1908 might indicate if the transaction is in-process or has been completed. The blockchain result 1910 might indicate whether or not the information has been verified via a distributed ledger. Note that other techniques could be used in additional to, or instead of, a blockchain process (and may or may not be included in the transaction database 1900). The signature identifier 1912 might comprise a unique alphanumeric string identifying a particular item (and be encoded into the geometry of the actual item), and the industrial asset definition file 1914 might contain a CAD file or link to a location where information defining the item is stored.

Figure 20:
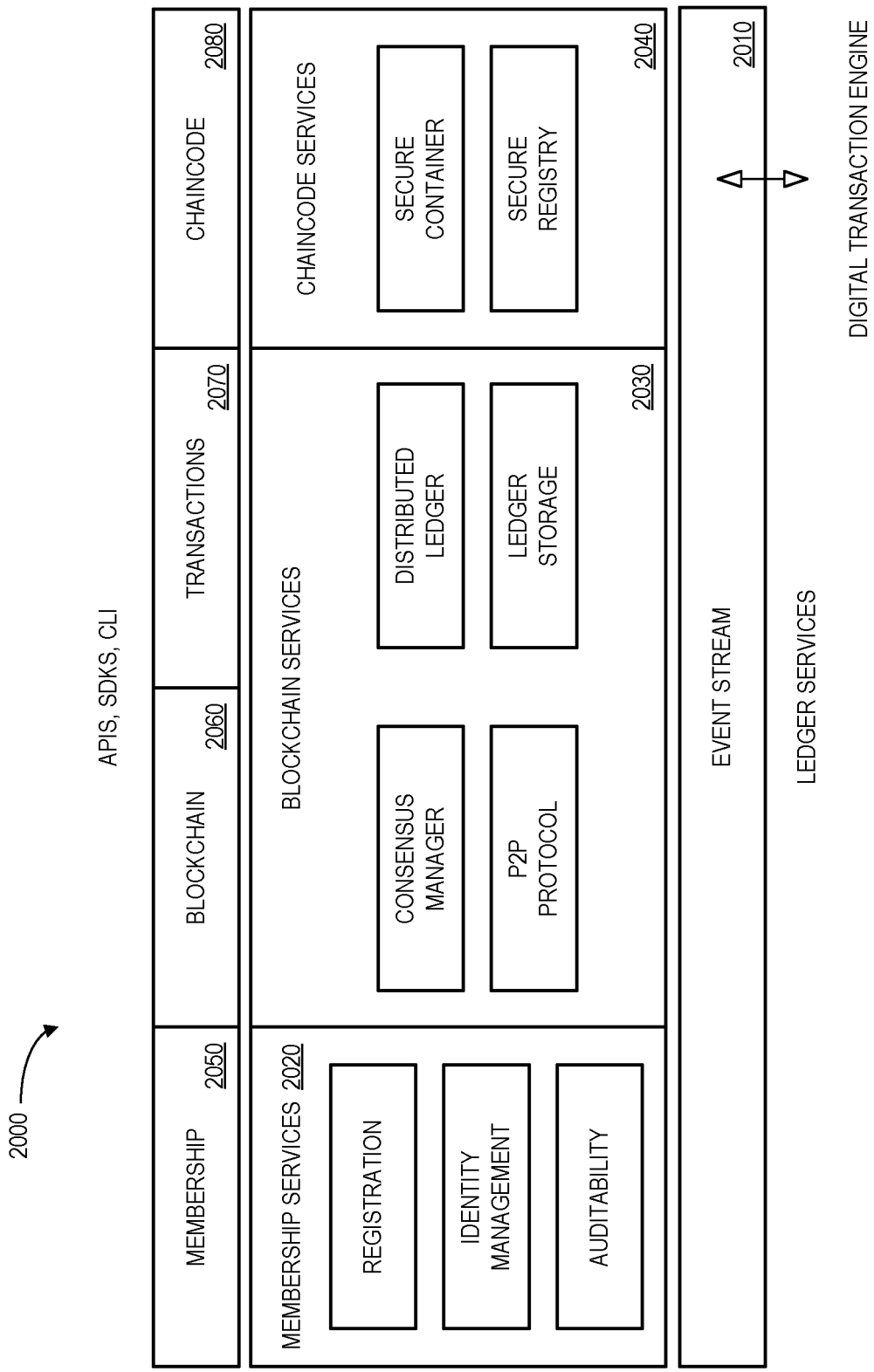
FIG. 20 is a distributed ledger reference architecture according to some embodiments.

Embodiments may be associated with any type of distributed ledger having a de-centralized consensus-based network that supports smart contracts, digital assets, record repositories, and/or cryptographic security. For example, FIG. 20 is a distributed ledger reference architecture 2000 according to some embodiments. The architecture 2000 includes ledger services and an event stream 2010 that may contain network security service information (e.g., from a digital transaction engine). Membership services 2020 (e.g., including registration, identity managements, and/or an auditability process) may manage identity, privacy, and confidentially for membership 2050 for the network security service. Blockchain services (e.g., including a consensus manager, Peer-to-Peer ("P2P") protocol, a distributed ledger, and/or ledger storage) may manage the distributed ledger through a P2P protocol built on HTTP to maintain a single state that replicated at many nodes to support blockchains 2060 and transactions 2070. Chaincode services 2040 (e.g., secure container and/or a secure registry associated with a smart contract) may help compartmentalize smart contract (or chaincode 2080) execution on validating nodes. Note that the environment may be a "locked down" and secured container with a set of signed base images that contain a secure OS and programming languages. Finally, APIs, Software Development Kits ("SDKs"), and/or a Command Line Interface ("CLI") may be utilized to support a network security service via the reference architecture 2000.

Thus, some embodiments described herein may protect the distribution of information associated with additive manufacturing. Moreover, embodiments may use blockchain technology to allow for the economic creation and distribution of engineering models required for manufacture in an advantageous manner. In addition, the creation of an independently verifiable pedigree viewable by accessing an online transaction record (as provided by the blockchain and the geometry of the item itself) may help eliminate counterfeit parts.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Some embodiments have been described with respect to the creation of an "industrial asset item," which might be, for example, an engine part, a generator component, etc. Note, however, that as used herein the phrase "industrial asset item" might refer to any other type of item, including: consumer electronics parts, toys, household goods, automotive parts, etc.

Figure 21:
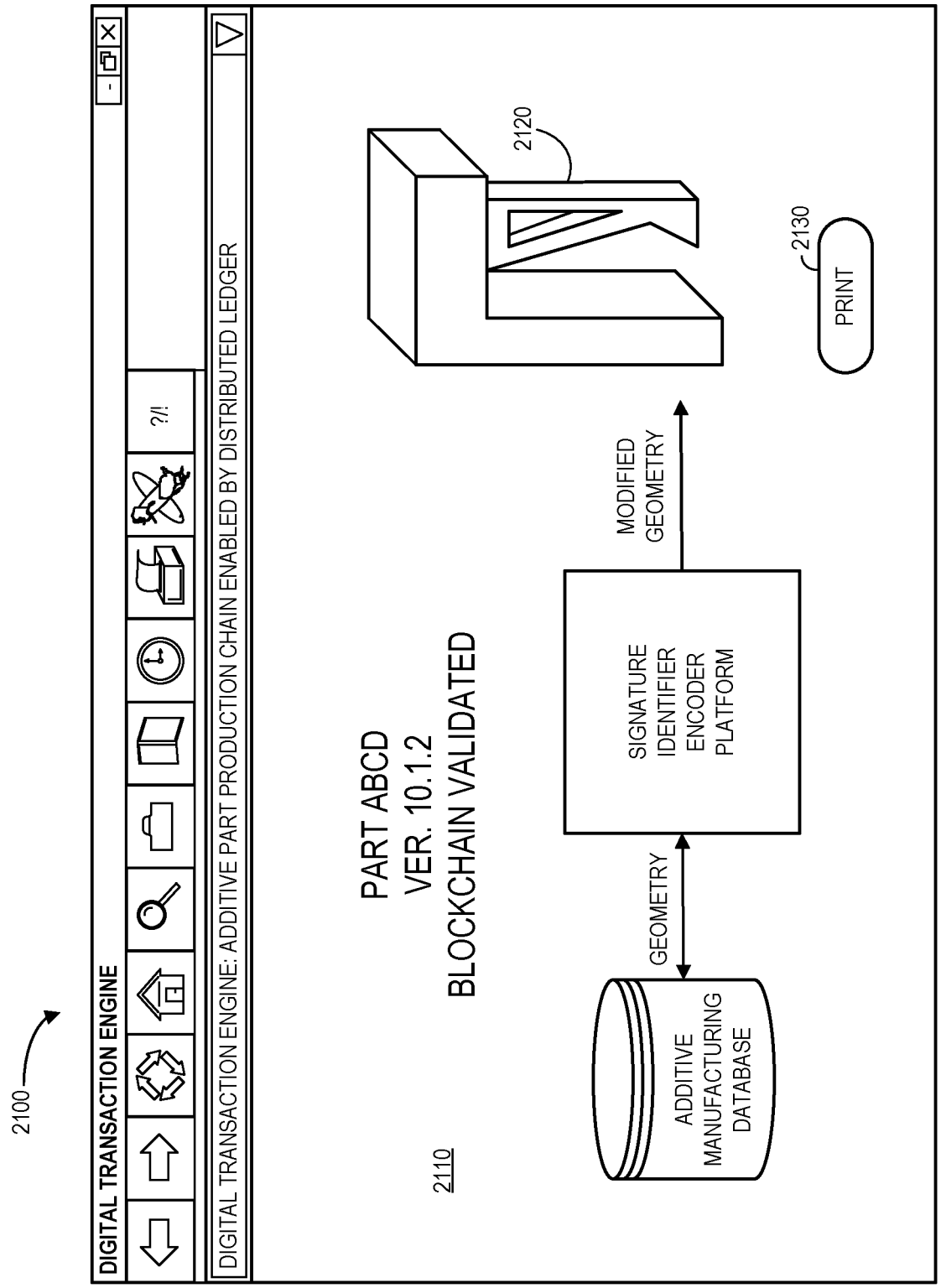
FIG. 21 illustrates a computer display in accordance with some embodiments.

Although specific hardware and data configurations have been described herein, note that any number of other configurations may be provided in accordance with embodiments of the present invention (e.g., some of the information described herein may be combined or stored in external systems). Similarly, the displays shown and described herein are provided only as examples, and other types of displays and display devices may support any of the embodiments. For example, FIG. 21 illustrates a digital transaction engine display 2100 that might utilize an interactive graphical user interface. The display 2100 might comprise a graphical overview 2110 of the devices associated with the item creation process and selection of an element on the display 2100 might result in further information about that element (and, in some cases, allow for an adjustment to be made in connection with that element). In addition to modifying a fill region, note that embodiments might alter the geometry of an item in any other way. For example, the geometry of a support structure 2120 a support structure of the industrial asset item or base plate of an item might be modified.

Figure 22:
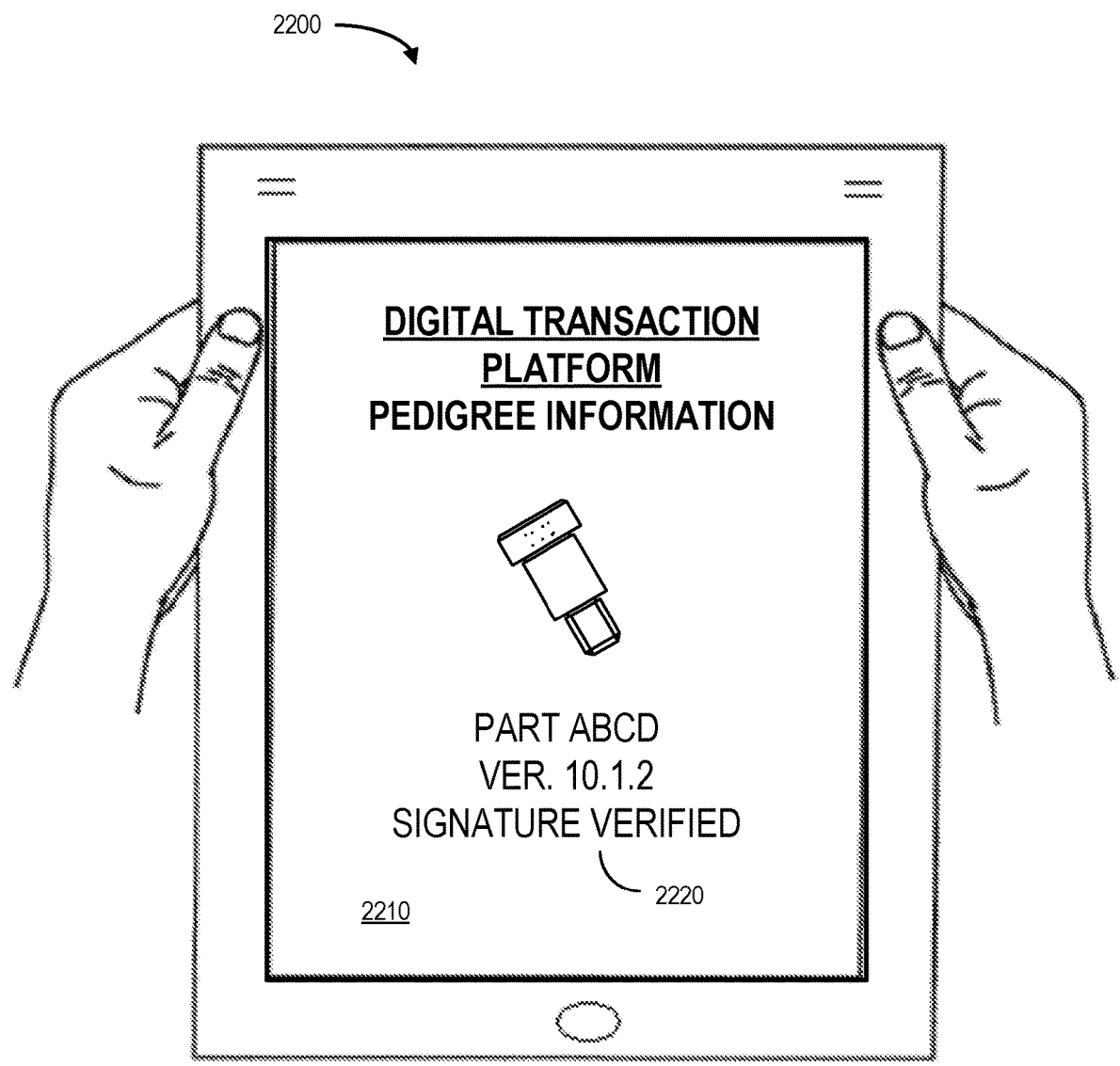
FIG. 22 illustrates a tablet computer providing a display according to some embodiments.

As another example, FIG. 22 illustrates a tablet computer 2200 providing a pedigree information display 2210 according to some embodiments. In particular, the pedigree information display 2210 may be an interactive user interface (e.g., via a touchscreen) and include a blockchain validation status 2220 in accordance with any of the embodiments described herein (e.g., a signature identifier might have been verified based on X-ray data collected from the actual item).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system to facilitate creation of an industrial asset item, comprising:

an item definition data store containing electronic records defining a geometry of the industrial asset item;
a signature identifier encoder platform, coupled to the item definition data store, including:
a communication port to receive from the item definition data store information about the geometry of the industrial asset item; and
a signature identifier encoder computer processor coupled to the communication port and adapted to:
determine a unique signature identifier associated with the industrial asset item,
modify the geometry of the industrial asset item to encode therein information about the unique signature identifier, wherein said modification comprises adjusting a scanning pattern of a fill region of the industrial asset item, wherein the industrial asset item includes an inside mold line portion, an outside mold line portion, and an interior geometry between the inside mold line portion and the outside mold line portion, wherein said modification includes adjusting a hatch angle of a structure connecting the inside mold line portion and the outside mold line portion to encode the unique signature identifier, and
transmit an indication of the modified geometry of the industrial asset item.

2. The system of claim 1, wherein the scanning pattern is associated with at least one of: (i) a stripe fill pattern, (ii) a checkerboard fill pattern, and (iii) an island fill pattern.

3. The system of claim 1, wherein said modification is associated with at least one of: (i) the hatch angle, (ii) a hatching distance, (iii) overlaps in the fill pattern, (iv) gaps in the fill pattern, (v) a parameter that changes in relation to location within the industrial asset item.

4. The system of claim 1, further comprising:
a signature identifier data store containing electronic records associating unique signature identifiers with industrial asset items; and
an authentication platform, coupled to the signature identifier data store, including:
a communication port to exchange information with the signature identifier data store; and
an authentication computer processor coupled to the communication port and adapted to:
receive, from a sensor, a measured characteristic parameter of an industrial asset item to be authenticated,
based on the measured characteristic parameter, determine a signature identifier of the industrial asset item to be authenticated,
search for the determined signature identifier in the signature identifier data store, and
transmit an indication of a result of the search.

5. The system of claim 4, wherein the measured characteristic parameter is associated with at least one of: (i) an electrical resistance, (ii) an X-ray value, (iii) a Computer Tomography ("CT") value, and (iv) a sonogram value.

6. The system of claim 1, wherein said modification comprises adjusting a scanning pattern of at least one of: (i) a support structure of the industrial asset item, and (ii) a base plate of the industrial asset item.

7. The system of claim 1, further comprising:
a secure, distributed ledger storing information about the unique signature identifier.

8. The system of claim 7, wherein the secure, distributed ledger comprises blockchain technology.

9. The system of claim 1, further comprising:
an additive manufacturing printer to create the industrial asset item in accordance with the modified, wherein the printer is associated with at least one of: (i) three-dimensional printing, (ii) vat photopolymerization, (iii) material jetting, (iv) binder jetting, (vi) material extrusion, (vii) powder bed fusion, (viii) sheet lamination, and (ix) directed energy deposition.

10. The system of claim 1, wherein the signature identifier encoder platform is associated with at least one of: (i) a single network cloud-hosted topology, (ii) a multiple network cloud-hosted topology, and (iii) a participant hosted intranet environment.

11. The system of claim 1, wherein the industrial asset item is associated with at least one of: (i) an engine, (ii) an aircraft, (iii) a locomotive, (iv) power generation, and (v) a wind turbine.

12. The system of claim 1, wherein the signature identifier encoder platform modifies the interior geometry of the industrial asset item.

13. The system of claim 12, wherein the scanning pattern includes a stripe fill pattern including the structures connecting the inside mold line portion and the outside mold line portion, wherein the structures are each separated by an interval.

14. The system of claim 13, wherein the signature identifier encoder platform modifies a width of the structures to encode the unique signature identifier.

* * * * *